United States Patent
Qu et al.

(10) Patent No.: US 12,265,095 B1
(45) Date of Patent: Apr. 1, 2025

(54) EXTRACTION OPERATION ROOM AND INTELLIGENT SAMPLE ACCESS SYSTEM

(71) Applicant: SHANGHAI ORIGINCELL BIOLOGICAL CRYO EQUIPMENT CO., LTD., Shanghai (CN)

(72) Inventors: Jianguo Qu, Shanghai (CN); Jianxin Wang, Shanghai (CN)

(73) Assignee: SHANGHAI ORIGINCELL BIOLOGICAL CRYO EQUIPMENT CO., LTD., Shanghai (CN)

( * ) Notice: Subject to any disclaimer, the term of this patent is extended or adjusted under 35 U.S.C. 154(b) by 0 days.

(21) Appl. No.: 18/848,147

(22) PCT Filed: Apr. 3, 2023

(86) PCT No.: PCT/CN2023/085925
§ 371 (c)(1),
(2) Date: Sep. 18, 2024

(87) PCT Pub. No.: WO2023/216768
PCT Pub. Date: Nov. 16, 2023

(30) Foreign Application Priority Data

May 10, 2022 (CN) .......................... 202210499997.4

(51) Int. Cl.
*G01N 35/04* (2006.01)
*B65G 47/90* (2006.01)
(Continued)

(52) U.S. Cl.
CPC ........... *G01N 35/04* (2013.01); *B65G 47/901* (2013.01); *B67B 7/00* (2013.01); *G01N 35/00584* (2013.01); *B65G 2203/0216* (2013.01); *G01N 2035/00445* (2013.01); *G01N 2035/046* (2013.01)

(58) Field of Classification Search
None
See application file for complete search history.

(56) References Cited

FOREIGN PATENT DOCUMENTS

CN 107381032 A 11/2017
CN 108128629 A 6/2018
(Continued)

*Primary Examiner* — Matthew D Krcha
(74) *Attorney, Agent, or Firm* — Bayramoglu Law Offices LLC

(57) ABSTRACT

An extraction operation room is provided. The extraction operation room is provided with a multi-stage Z-direction extraction arm and an X-direction pushing system. Movement on a multi-distance road section in a Z-axis direction is realized by using the multi-stage Z-direction extraction arm, such that the movement of an extraction member on the multi-distance road section in the Z-axis direction is realized, thereby greatly increasing the depth or length of the movement in a Z axis. The corresponding X-direction pushing system is provided, and the X-direction pushing system realizes the movement of a tank cover of a sample storage tank or a storage box in an X-axis direction. An operation space is given when the movement in the Z-axis direction and the X-axis direction are implemented, and meanwhile, the extraction structure is reasonable in design, small in occupied space, relatively low in cost, and convenient and intelligent to operate.

24 Claims, 10 Drawing Sheets

(51) Int. Cl.
*B67B 7/00* (2006.01)
*G01N 35/00* (2006.01)

(56) References Cited

FOREIGN PATENT DOCUMENTS

| | | | | | |
|---|---|---|---|---|---|
| CN | 208182143 | U | | 12/2018 | |
| CN | 112716256 | A | | 4/2021 | |
| CN | 112744497 | A | * | 5/2021 | ............. B65B 43/40 |
| CN | 113104469 | A | | 7/2021 | |
| CN | 113148417 | A | | 7/2021 | |
| CN | 114633982 | A | | 6/2022 | |
| EP | 2019277 | A2 | | 1/2009 | |
| JP | 2001039505 | A | | 2/2001 | |

* cited by examiner

EXTRACTION OPERATION ROOM AND INTELLIGENT SAMPLE ACCESS SYSTEM

CROSS-REFERENCE TO THE RELATED APPLICATIONS

This application is the national phase entry of International Application No. PCT/CN2023/085925, filed on Apr. 3, 2023, which is based upon and claims priority to Chinese Patent Application No. 202210499997.4, filed on May 10, 2022, the entire contents of which are incorporated herein by reference.

TECHNICAL FIELD

The present disclosure relates to the field of biological sample storage, particularly relates to extraction and storage of biological samples, and specifically relates to an extraction operation room and an intelligent sample access system.

BACKGROUND

In the prior art, the efficiency of transporting and transferring biological samples is too low, and a continuous cold chain during the sample access process cannot be guaranteed; the structural design of the existing storage equipment of biological samples occupies a large space, making transfer or access of samples inconvenient when a plurality of samples are stored, the continuous cold chain cannot be guaranteed throughout the process, and industrialized operation and management cannot be achieved.

SUMMARY

A first objective of the present disclosure is to provide an extraction operation room, to solve the problems of unreasonable design, excessive space occupation, and poor sealing and heat preservation in the mechanisms for extracting the tank covers of sample storage tanks and storage boxes in the prior art.

A second objective of the present disclosure is to provide an intelligent sample access system, to solve the problems of inflexibility in existing sample access systems, that addresses the problems of inflexibility in existing sample access systems, difficulty in operating the docking, transfer, or access of a plurality of sample storage tanks, and the inability to ensure a full cold chain. In addition, the existing access systems are unable to achieve industrialized operation and management.

In order to solve the technical problems, the present disclosure adopts the following technical solution, an extraction operation room, including a multi-stage Z-direction extraction arm and an X-direction pushing system, where the multi-stage Z-direction extraction arm is a movable arm capable of achieving movements on a multi-distance road section in a Z-axis direction, an extraction member is arranged on the multi-stage Z-direction extraction arm, and the multi-stage Z-direction extraction arm is capable of driving the extraction member to move in the Z-axis direction; and the X-direction pushing system is arranged in a position corresponding to the extraction member, and the X-direction pushing system is capable of pushing a tank cover of a sample storage tank or a storage box extracted by the extraction member to a target position.

Preferably, the multi-stage Z-direction extraction arm includes a first Z-direction extraction arm, a second Z-direction extraction arm, and a receiving horizontal driving arm; the receiving horizontal driving arm is arranged on the first Z-direction extraction arm, the first Z-direction extraction arm is capable of driving the receiving horizontal driving arm to move in the Z-axis direction, and the second Z-direction extraction arm is arranged on the receiving horizontal driving arm; the receiving horizontal driving arm is capable of driving the second Z-direction extraction arm to move horizontally in an X-axis direction; and the extraction member is arranged on the second Z-direction extraction arm, and the second Z-direction extraction arm is capable of driving the extraction member to move up and down in the Z-axis direction.

Preferably, the first Z-direction extraction arm includes a Z-direction driving sub-electric cylinder A, a Z-direction driving sub-electric cylinder B, a Z-direction track A, and a Z-direction track B; and the receiving horizontal driving arm includes a driving track C and a driving electric cylinder C; the Z-direction track A and the Z-direction track B are vertically and symmetrically fixed in the Z-axis direction inside the extraction operation room, respectively, two ends of the driving track C are slidably arranged on the Z-direction track A and the Z-direction track B, respectively, and the Z-direction driving sub-electric cylinder A and the Z-direction driving sub-electric cylinder B drive the two ends of the driving track C to move up and down, respectively; and the second Z-direction extraction arm is arranged on the driving track C in a sliding manner, and is driven by the driving electric cylinder C; and the second Z-direction extraction arm includes a Z-direction driving electric cylinder D, and a lifting member is arranged on the Z-direction driving electric cylinder D, which drives the lifting member to move up and down.

Preferably, the X-direction pushing system further includes an X-direction pushing member and a tank cover storage area; the X-direction pushing member is arranged opposite to the tank cover storage area; and the X-direction pushing member is capable of pushing the tank cover or the storage box extracted by the extraction member to the tank cover storage area or the target position.

Preferably, the X-direction pushing system further includes the X-direction pushing member and the tank cover storage area; the X-direction pushing member and the tank cover storage area are respectively arranged on both sides of the multi-stage Z-direction extraction arm in the X-axis direction; the X-direction pushing member is capable of pushing the tank cover or the storage box extracted by the extraction member to the tank cover storage area or the target position; the X-direction pushing member includes a pushing base frame, a pushing drive motor, an X-axis moving push plate, and a pushing guide rod; the pushing base frame is fixed below one side of the multi-stage Z-direction extraction arm, the pushing drive motor and the pushing guide rod are separately fixed on the pushing base frame, and the X-axis moving push plate moves along the pushing guide rod under the drive of the pushing drive motor; the X-axis moving push plate is capable of moving and extending from one side of the multi-stage Z-direction extraction arm to the other side thereof, and is close to the tank cover storage area; and a reception and storage port is formed on one side of the tank cover storage area near the X-axis moving push plate.

Preferably, the extraction operation room further includes a Y-direction receiving system, the Y-direction receiving system is capable of receiving the storage box and transporting the storage box to a position corresponding to the X-direction pushing system.

Preferably, the Y-direction receiving system further includes Y-direction tracks, a Y-direction movable tray, and a storage box receiving channel; the Y-direction tracks extend in a Y-axis direction and is arranged below the pushing base frame; the storage box receiving channel is arranged on the Y-direction tracks in a sliding manner, and the storage box receiving channel has a certain length in the X-axis direction; and the Y-direction movable tray is arranged in the storage box receiving channel in the X-axis direction in a sliding manner;

Preferably, the Y-direction receiving system further includes a storage box pushing member, the storage box pushing member is arranged in a position corresponding to the storage box receiving channel, and is capable of pushing the Y-direction movable tray in the storage box receiving channel.

Preferably, the storage box pushing member includes a storage box pushing drive motor and a storage box pushing plate, the storage box pushing drive motor is arranged on a lower end face of the pushing base frame, the storage box pushing plate is arranged on the lower end face of the pushing base frame in a sliding manner, and the storage box pushing drive motor drives the storage box pushing plate to perform telescopic movements in the X-axis direction.

Preferably, the storage box pushing plate includes a first storage box pushing sub-plate, a second storage box pushing sub-plate, and a storage box pushing head, an upper end face of the first storage box pushing sub-plate is arranged on the lower end face of the pushing base frame in a sliding manner, one end of the first storage box pushing sub-plate is fixed at a right angle with one end of the second storage box pushing sub-plate, the other end of the second storage box pushing sub-plate is fixed at a right angle with the storage box pushing head, and the storage box pushing plate is shaped like an inverted "Z".

Preferably, the Y-direction receiving system further includes a Y-direction driving motor, a Y-direction rotating shaft screw, and a storage box receiving channel engaging nut; the Y-direction driving motor drives one end of the Y-direction rotating shaft screw to rotate, and the other end of the Y-direction rotating shaft screw is rotationally arranged at one end of the Y-direction tracks away from the pushing base frame; the storage box receiving channel engaging nut is fixed at one end of the storage box receiving channel, and the Y-direction rotating shaft screw is engaged with the storage box receiving channel engaging nut; and the Y-direction driving motor is arranged below a connection between the first storage box pushing sub-plate and the second storage box pushing sub-plate, and the storage box receiving channel is capable of moving to a position corresponding to the storage box pushing head.

Preferably, the Y-direction receiving system further includes a cryogenic protection member, the cryogenic protection member is arranged beneath the storage box receiving channel or fixed to a lower end face of the storage box receiving channel; and an accommodating cavity is formed inside the cryogenic protection member, a plurality of nitrogen ports communicating with the accommodating cavity are formed on an upper end face of the cryogenic protection member, and the accommodating cavity is also communicated with a nitrogen supply pipeline.

Preferably, the cryogenic protection member is box-shaped, cylindrical, or hemispherical.

Preferably, the tank cover storage area includes a tank cover storage shell and a tank cover storage driving member, the reception and storage port is formed on one side of the tank cover storage shell close to the X-direction pushing member, and a tank cover extraction port is formed on an end face of the tank cover storage shell close to the extraction member; and the tank cover storage driving member is capable of driving the tank cover storage shell to move in the X-axis direction.

Preferably, the tank cover storage driving member includes a storage drive base, a storage drive track, and a storage drive linking plate frame; and the storage drive base is fixed inside the extraction operation room and is located below the other side of the multi-stage Z-direction extraction arm; the storage drive track is arranged on the storage drive base; and one end of the storage drive linking plate frame is arranged on the storage drive track in a sliding manner, and the other end thereof is fixed on the tank cover storage shell.

Preferably, the storage drive base is arranged above the tank cover storage shell, and a first storage sub-drive track and a second storage sub-drive track are symmetrically arranged on both sides of an upper end face of the storage drive base; and two rows of driving channels are arranged on two sides of the first storage sub-drive track and the second storage sub-drive track at the upper end face of the storage drive base in the X-axis direction; and the storage drive linking plate frame includes a storage drive sliding plate, a first storage drive clamping plate, and a second storage drive clamping plate; the storage drive sliding plate is arranged on the first storage sub-drive track and the second storage sub-drive track in a sliding manner; an upper end of the first storage drive clamping plate is vertically fixed on one side of the storage drive sliding plate, and a lower end of the first storage drive clamping plate passes through the driving channels on one side and is fixed on tank cover storage shell; and an upper end of the second storage drive clamping plate is vertically fixed to the other side of the storage drive sliding plate, and a lower end of the second storage drive clamping plate passes through the driving channels on the other side and is fixed on tank cover storage shell.

Preferably, the extraction operation room further includes a storage box returning member; where the storage box returning member is arranged in a position opposite to the storage box pushing plate; and the storage box returning member includes a returning push plate, and the returning push plate is capable of performing telescopic movements in the X-axis direction.

Preferably, the storage box returning member further includes a returning member base plate and a returning member drive motor; and the returning member base plate is arranged below the tank cover storage shell and in a position opposite to the storage box returning member, the returning push plate is slidably arranged on the returning member base plate under the drive of the returning member drive motor, and a returning pushing head is arranged on one side of the returning push plate close to the storage box pushing head.

Preferably, a negative magnetic member is arranged on an upper end face of the tank cover, and a negative magnetic member is also arranged on an upper end face of the lifting basket.

Preferably, the multi-stage Z-direction extraction arm further includes an X-advanced arm, the X-advanced arm is arranged on the second Z-direction extraction arm, and the second Z-direction extraction arm is capable of driving the X-advanced arm to move up and down in the Z-axis direction; and the extraction member is arranged on the X-advanced arm, and the X-advanced arm is capable of driving the extraction member to move in the X-axis direction; and an extraction handle extending to both sides is arranged at a lower end of the extraction member, a receiving slot is formed on an upper end face of the tank cover, the receiving slot is capable of receiving the extraction handle in the X-axis direction, and the extraction handle is capable of restricting the extraction of the receiving slot in the Z-axis direction.

Preferably, the extraction operation room further includes a transfer docking member, and the extraction operation room and the sample storage tank;

the extraction operation room is sealed and arranged at an upper end of the sample storage tank; and a sealing docking port is formed on the extraction operation room; and the transfer docking member is arranged on an outer side of the sample storage tank, the transfer docking member is capable of receiving a transfer box, and driving the transfer box to have an opening of the transfer box docked with the sealing docking port.

Preferably, the transfer docking member includes moving tracks, a mobile trolley, and a docking driving member; the moving tracks are arranged on the outer side of the sample storage tank, the mobile trolley is arranged on the moving tracks, and the mobile trolley is capable of driving the transfer box to move along the moving tracks; and the transfer docking member is capable of driving the transfer box, such that the opening of the transfer box is docked with the sealing docking port;

Preferably, the moving tracks are C-shaped, U-shaped or concave.

Preferably, the docking driving member includes a docking drive motor, vertical docking tracks, and docking lifting frames; and the docking drive motor drives the docking lifting frames to move up and down along the vertical docking tracks;

the moving tracks are arranged at upper ends of the vertical docking tracks, forming a T-shape or an inverted L-shape; and one end of each of the moving tracks passes through the docking lifting frames; and upper ends of the docking lifting frames are two non-connected free ends, and each of the free ends is provided with a lifting receiving plate; a lifting support plate is arranged between the two lifting receiving plates; and the transfer box can be placed or arranged on the lifting support plate.

Preferably, the mobile trolley includes a trolley base, a trolley battery, and a contact pad connection plate; and trolley sliding grooves are formed on a lower end face of the trolley base, the trolley sliding grooves are slidably arranged on the moving tracks; the trolley battery is arranged at a lower end of the trolley base, and the trolley battery is electrically connected to the contact pad connection plate; and a power contact plate is arranged on the moving tracks and in a position below the trolley base and corresponding to the contact pad connection plate.

Preferably, the mobile trolley further includes a distance sensor, a microcontroller, a trolley motor, and trolley wheels, the distance sensor is arranged on the lower end face of the trolley base; and the microcontroller is electrically connected to both the distance sensor and the trolley motor, and the trolley motor is configured to drive the trolley wheels to move on the moving tracks.

Preferably, the moving tracks includes a first sub-track, a second sub-track, and the mobile trolley support plate; the first sub-track and the second sub-track are symmetrically arranged on both sides of an upper end face of the mobile trolley support plate; and two sets of the trolley sliding grooves are formed on two sides of the lower end face of the trolley base, and the two sets of the trolley sliding groove are slidably arranged on the first sub-track and the second sub-track, respectively; the power contact plate is arranged on the mobile trolley support plate; and wheel pads are arranged on the mobile trolley support plate, and the trolley wheels move on the wheel pads.

Preferably, a trolley positioning column is fixedly arranged on an upper end face of the trolley base of the mobile trolley; and a positioning hole corresponding to the trolley positioning column is formed on the lifting support plate.

Preferably, the extraction operation room further includes a cover opening mechanism, the cover opening mechanism is arranged in a position corresponding to the sealing docking port, and the cover opening mechanism is capable of opening a transfer box cover on the opening of the transfer box docked with the sealing docking port.

Preferably, the cover opening mechanism includes a cover-opening fixed base, a cover-opening drive member, a cover-opening large arm rod, a cover-opening small arm rod and a cover-opening disk; the cover-opening fixed base is fixed inside the extraction operation room, and the cover-opening drive member is arranged on the cover-opening fixed base; one end of the cover-opening large arm rod is rotationally arranged on the cover-opening fixed base, one end of the cover-opening small arm rod is rotationally arranged on the other end of the cover-opening large arm rod, and the cover-opening disk is fixedly arranged on the other end of the cover-opening small arm rod; and the cover-opening drive member drives the cover-opening large arm rod to rotate.

Preferably, the cover-opening disk includes a cover-opening body disk, a cover-opening positioning rod, and cover-opening electromagnetic members;

the cover-opening body disk is fixed at the other end of the cover-opening small arm rod, and the cover-opening positioning rod and a cover-opening electromagnetic positive member are arranged on the cover-opening body disk; a transfer box positioning hole is formed on the transfer box cover, and the cover-opening positioning rod is capable of being inserted into the transfer box positioning hole; and an electromagnetic negative member of the transfer box cover is arranged on the transfer box cover, and the cover-opening electromagnetic positive member is capable of being adsorbed with the electromagnetic negative member of the transfer box cover.

Preferably, the cover-opening drive member includes a cover-opening drive motor, a cover-opening drive guide rail, and a cover-opening drive sliding base; and the cover-opening drive motor drives the cover-opening drive sliding base to move up and down along the cover-opening drive guide rail, the cover-opening drive sliding base extends outwardly and is provided with a cover-opening rotating shaft, one end of the cover-opening rotating shaft is fixed on the cover-opening drive sliding base, and the other end of the cover-opening rotating shaft is rotationally or fixedly arranged on the cover-opening small arm rod.

Preferably, the sample storage tank includes a sample tank body, a built-in liquid nitrogen tank body, a turntable, a sample storage rotating shaft member, a sample storage motor, the lifting basket, and the tank cover; an upper end face of the sample tank body is covered with the tank cover; the built-in liquid nitrogen tank body is arranged inside the sample tank body, and a receiving rotary groove is formed on an upper end face of the internal liquid nitrogen tank body; the sample storage motor drives the sample storage rotating shaft member to rotate, and a lower end of the sample storage rotating shaft member is rotationally arranged on the receiving rotary groove; a turntable is fixedly arranged on a periphery of the sample storage rotating shaft member; the lifting basket is arranged on the turntable; the sample storage rotating shaft member includes a central rotating shaft and a receiving rotary shaft; the sample storage motor drives the central rotating shaft, the central rotating shaft contains a nitrogen filling chamber, and a lower end of the central rotating shaft is coaxially connected to the receiving rotary shaft, and a lower end of the receiving rotary shaft is rotationally arranged in the receiving rotary groove.

Preferably, an insulating layer is arranged on a tank wall inside the sample tank body.

Preferably, the extraction operation room is further provided with a defrosting mechanism and a barcode scanning and recognition device, the defrosting mechanism is arranged near the sealing docking port, and the barcode scanning and recognition device is arranged near the defrosting mechanism.

Preferably, the extraction operation room is further provided with an observation window and a detachable operation door.

The present disclosure has the first beneficial effect as follows: the extraction operation room is provided with a multi-stage Z-direction extraction arm and an X-direction pushing system. Movement on a multi-distance road section in the Z-axis direction is realized by using the multi-stage Z-direction extraction arm, such that movements of the extraction member on the multi-distance road section in the Z-axis direction is realized, thereby greatly increasing the depth or length of the movement in a Z axis. The corresponding X-direction pushing system is provided, and the X-direction pushing system drives a tank cover of a sample storage tank or a storage box to move in the X-axis direction. An operation space is given when the movement in the Z-axis direction and the X-axis direction are implemented, and meanwhile, the extraction structure is reasonable in design, small in occupied space, relatively low in cost, convenient and intelligent to operate, and high in sealing and heat preservation.

The present disclosure has the second beneficial effect as follows: the intelligent sample access system ensures the full cold chain, and connection of a plurality of devices can be realized by means of sample access to form an industrial access line, such that the sample access efficiency is greatly improved, and meanwhile, the management of the access sample industry line is facilitated.

Figure 1:
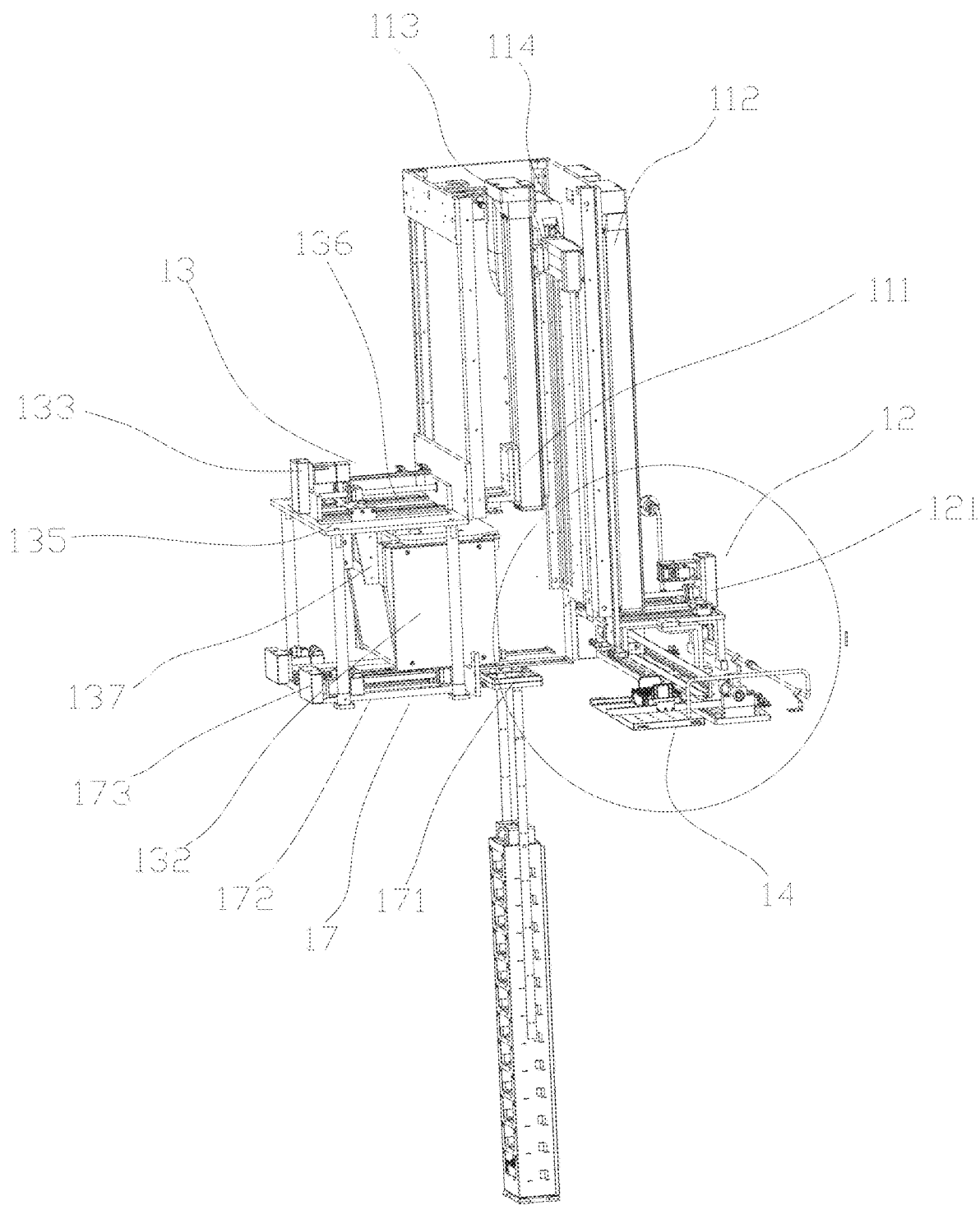
FIG. 1 is a structural schematic diagram of a multi-stage Z-direction extraction arm.

Reference numerals in the accompanying drawings:

Extraction operation room 1:
- 11. multi-stage Z-direction extraction arm; 111. extraction member; 1112. extraction handle; 1113. receiving slot;
- 112. first Z-direction extraction arm; 113. second Z-direction extraction arm; 114. receiving horizontal driving arm; 115. Z-direction driving sub-electric cylinder A; 116. Z-direction driving sub-electric cylinder B; 117. Z-direction track A; 118. Z-direction track B; 119. driving track C; 120. driving electric cylinder C; 121. Z-direction driving electric cylinder D;
- 12. X-direction pushing system; 121. X-direction pushing member; 122. pushing base frame; 123. pushing drive motor; 124. X-axis moving push plate; and 125. pushing guide rod;
- 13. tank cover storage area; 131. reception and storage port; 132. tank cover storage shell; 133. tank cover storage driving member; 134. tank cover extraction port; 135. storage drive base; 136. storage drive track; 137. storage drive linking plate frame; 138. first storage sub-drive track; 139. second storage sub-drive track; 1310. driving channel; 1311. storage drive sliding plate; 1312. first storage drive clamping plate; 1313. second storage drive clamping plate;
- 14. Y-direction receiving system; 141. Y-direction tracks; 142. Y-direction movable tray; 143. storage box receiving channel;
- 144. Y-direction driving motor; 145. Y-direction rotating shaft screw; 146. storage box receiving channel engaging nut;
- 15. storage box pushing member; 151. storage box pushing drive motor; 152. storage box pushing plate; 153. first storage box pushing sub-plate; 154. second storage box pushing sub-plate; 155. storage box pushing head;
- 16. cryogenic protection member; 161. nitrogen port;
- 17. storage box returning member; 171. returning push plate; 172. returning member base plate; 173. returning member drive motor; 174. returning pushing head;
- 18. sealing docking port;
- 1000. storage box; 2000. sample storage tank; 3000. lifting basket; 4000. tank cover; 5000. operating gripper; and 6. lifting basket receiving tray; m
- 7. transfer docking member; 701. transfer box; 702. moving track; 703. mobile trolley; 704. docking driving member; 705. docking drive motor; 706. vertical docking tracks; 707. docking lifting frames; 708. lifting receiving plate; 709. lifting support plate; 710. transfer box limiting plate; 711. first sub-track; 712. second sub-track; 713. mobile trolley support plate; and 714. wheel pad;
- 8. trolley base; 801. trolley battery; 802. contact pad connection plate; 803. trolley sliding groove; 804. power contact plate; 805. trolley positioning column; 806. distance sensor; 807. microcontroller; 808. trolley motor; 809. trolley wheels;
- 9. cover opening mechanism; 901. cover-opening fixed base; 902. cover-opening drive member; 903. cover-opening large arm rod; 904. cover-opening small arm rod; 905. cover-opening disk; 906. cover-opening positioning rod; 907. cover-opening electromagnetic member; 908. cover-opening drive guide rail; 909. cover-opening drive sliding base;

20. sample tank body; 201. built-in liquid nitrogen tank body; 202. turntable; 203. sample storage rotating shaft member; 204. sample storage motor; 205. receiving rotary groove; 206. central rotating shaft; and 207. receiving rotary shaft;

10. defrosting mechanism; 101. barcode scanning and recognition device; 102. observation window; and 103. detachable operation door.

DETAILED DESCRIPTION OF THE EMBODIMENTS

The technical solution of the present disclosure will be further described below with reference to the embodiments.

After being extracted, a biological sample needs to be stored in one biological sample cryopreservation tube, a plurality of the biological sample cryopreservation tubes are uniformly stored in one storage box 1000, and a plurality of the storage boxes 1000 are stored in one sample storage tank 2000 for low-temperature storage; and a lifting basket 3000 is arranged inside the sample storage tank 2000, and the plurality of the storage boxes 1000 are stored in the lifting basket 3000 for easy access. A low temperature environment of the existing sample storage tank 2000 is formed by nitrogen supply, that is, a liquid nitrogen tank. When the biological sample cryopreservation tubes are extracted from the sample storage tank 2000, a tank cover 4000 of the sample storage tank 2000 is opened firstly, the storage boxes 1000 are extracted from the lifting basket, the storage boxes 1000 are then put in a transfer box 701, and the storage boxes are transferred through the transfer box 701. It should be noted there that sealing of the tank cover 4000 important, and in order to maintain the low-temperature environment inside the sample storage tank 2000, a cover opening mechanism can be set during extraction; and the sample storage tank 2000 is opened to extract take out the lifting basket 3000, and a target cryopreservation tube is then taken out from the lifting basket from the lifting basket 3000. An access process is a reverse process of the above description, which will not be repeated any more.

Embodiment 1

In the operation process, the present disclosure provides an extraction operation room 1, which can ensure that the cryopreservation tubes can be extracted from the lifting basket 3000 after the tank cover 4000 of the sample storage tank 2000 is opened in a sealed low-temperature environment. An operation space is given when movements in a Z-axis direction and an X-axis direction are implemented, and meanwhile, an extraction structure is reasonable in design, small in occupied space, relatively low in cost, convenient and intelligent to operate, and high in sealing and heat preservation.

This embodiment provides an extraction operation room, including a multi-stage Z-direction extraction arm 11 and an X-direction pushing system 12, where the multi-stage Z-direction extraction arm 11 is a movable arm capable of achieving movements on a multi-distance road section in the Z-axis direction, an extraction member 111 is arranged on the multi-stage Z-direction extraction arm 11, and the multi-stage Z-direction extraction arm 11 is capable of driving the extraction member 111 to move in the Z-axis direction; and the X-direction pushing system 12 is arranged in a position corresponding to the extraction member 111, and the X-direction pushing system 12 is capable of pushing the tank cover 4000 of the sample storage tank 2000 or the storage box 1000 extracted by the extraction member 111 to a target position.

The multi-stage Z-direction extraction arm 11 (a Z-direction positioning vertical direction in this embodiment, the same below, without repeated description below) disclosed in the present disclosure can be a Z-direction manipulator or a Z-direction driving arm, which will not be limited herein, and a multi-segment and multi-distance movable arm fall within the scope of protection of the present disclosure; and the multi-stage Z-direction extraction arm 11 in cooperation with the X-direction pushing system 12 can significantly reduce an occupied area, featuring relatively low cost, being convenient and intelligent to operate, and high in sealing and heat preservation. In the prior art, various three-axis manipulators are available, which not only occupy a considerable space, but also have poor sealing and heat preservation.

A preferred implementation of the multi-stage Z-direction extraction arm 11 in this embodiment: the multi-stage Z-direction extraction arm 11 further includes a first Z-direction extraction arm 112, a second Z-direction extraction arm 113, and a receiving horizontal driving arm 114; and the receiving horizontal driving arm 114 is arranged on the first Z-direction extraction arm 112, the first Z-direction extraction arm is capable of driving the receiving horizontal driving arm 114 to move in the Z-axis direction, and the second Z-direction extraction arm 113 is arranged on the receiving horizontal driving arm; the receiving horizontal driving arm is capable of driving the second Z-direction extraction arm to move horizontally in the X-axis direction; the extraction member 111 is arranged on the second Z-direction extraction arm 113, and the second Z-direction extraction arm is capable of driving the extraction member to move up and down in the Z-axis direction; the first Z-direction extraction arm is capable of driving the receiving horizontal driving arm to move in the Z-axis direction, that is, a vertical direction, such that the receiving horizontal driving arm is capable of driving the second Z-direction extraction arm to move vertically in an operable movement section of the first Z-direction extraction arm; the second Z-direction extraction arm itself has an operable vertical movement section in the Z-axis direction, such that two operable road sections are formed in a vertical direction of the Z-axis, which greatly increases depth and length of operation in the vertical direction; and the receiving horizontal driving arm facilitates horizontal movements of the second Z-direction extraction arm in the X-axis direction, enabling the second Z-direction extraction arm to realize the movement in the X-axis direction, this design does not occupy a lot space, but exhibits strong stability and a wide range of operation.

In order to better cooperation with the X-direction pushing system, further, this embodiment discloses a more specific embodiment of the multi-stage Z-direction extraction arm, where the first Z-direction extraction arm includes a Z-direction driving sub-electric cylinder A 115, a Z-direction driving sub-electric cylinder B 116, a Z-direction track A 117, and a Z-direction track B 118; and the receiving horizontal driving arm 114 includes a driving track C 119 and a driving electric cylinder C 120; and the Z-direction track A 117 and the Z-direction track B 118 are vertically and symmetrically fixed in the Z-axis direction inside the extraction operation room 1, respectively, two ends of the driving track C 119 are slidably arranged on the Z-direction track A and the Z-direction track B, respectively, and the Z-direction driving sub-electric cylinder A and the Z-direction driving sub-electric cylinder B drive the two ends of the driving track C 119 to move up and down, respectively; the Z-direction track A 117 and the Z-direction track B 118 are symmetrically arranged, a space between the Z-direction track A and the Z-direction track B can be an operating space 12 of the X-direction pushing system, such that a setting position of the X-direction pushing system 12 can be determined according to the extraction member, and a structural design is more reasonable; and after extracting the tank cover 4000 of the sample storage tank 2000, a position of the extraction member is between the Z-direction track A and the Z-direction track B, such that the X-direction pushing system pushes the tank cover to the target position or a tank cover storage area.

The second Z-direction extraction arm 113 is arranged on the driving track C 119 in a sliding manner, and is driven by the driving electric cylinder C 120; and the second Z-direction extraction arm 113 includes a Z-direction driving electric cylinder D 121, and a lifting member is arranged on the Z-direction driving electric cylinder D 121, which drives the lifting member to move up and down.

The multi-stage Z-direction extraction arm 11 is arranged on the sample storage tank 2000, and a process of extracting the tank cover or the lifting basket using the multi-stage Z-direction extraction arm is as follows: the Z-direction driving sub-electric cylinder A 115 and the Z-direction driving sub-electric cylinder B 116 drive the driving track C 119 to move downwards, such that the second Z-direction extraction arm 113 arranged on the driving track C 119 is driven to move downwards; of course, the driving electric cylinder C is also capable of driving the second Z-direction extraction arm to move in a horizontal direction on the driving track C, such that the extraction member arranged on the second Z-direction extraction arm can move to an appropriate position in the horizontal direction; and after the first Z-direction extraction arm moves, the second Z-direction extraction arm can be arranged so as to meet the requirements of extracting from a deeper position, and the second Z-direction extraction arm moves up and down under the driving of the Z-direction driving electric cylinder D, such that the lifting member is driven to move up and down, and to extract the tank cover of the sample storage tank.

This embodiment discloses two implementation methods of the extraction member, one of which is that: an anode electromagnetic member is arranged on the extraction member 111; and an upper end face of the tank cover is provided with a cathode magnetic member, and an upper end face of the lifting basket is further provided with a cathode magnetic member. When the tank cover needs to be extracted, the extraction member moves downwards to the upper end face of the tank cover, and extraction of the tank cover is realized using the cooperation of the anode electromagnetic member and the cathode magnetic member; when the tank cover needs to be released, the anode electromagnetic member is powered off to achieve release; similarly, extraction of the lifting basket by the extraction member is also achieved by using the cooperation of the anode electromagnetic member and the cathode magnetic member.

Figure 11:
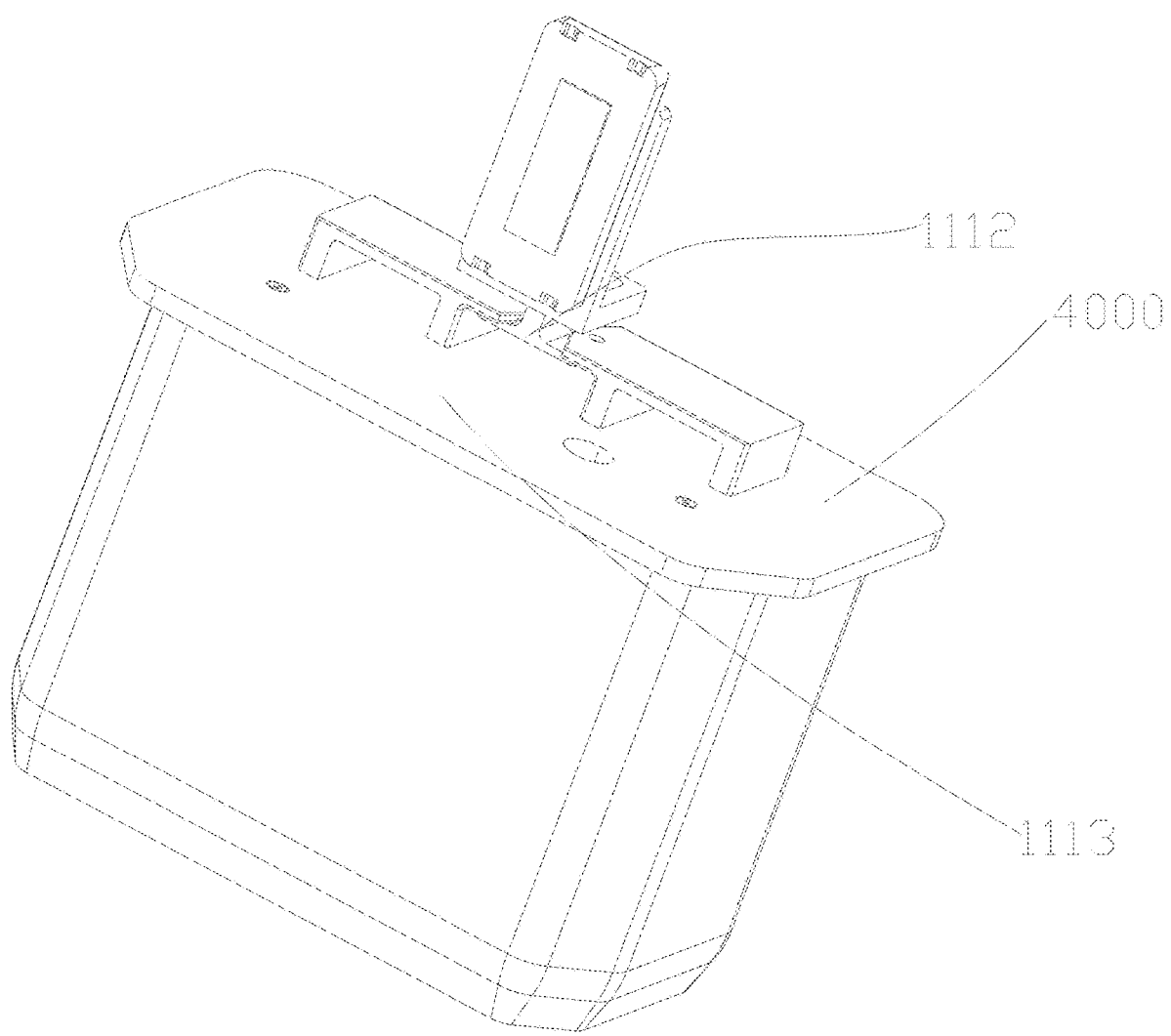
FIG. 11 is a structural schematic diagram of an extraction handle and a receiving slot.

In a preferred implementation of the extraction member in this embodiment, the multi-stage Z-direction extraction arm 11 further includes an X-advanced arm (not shown in the figure), the X-advanced arm is arranged on the second Z-direction extraction arm 113, and the second Z-direction extraction arm 113 is capable of driving the X-advanced arm to move up and down in the Z-axis direction; the extraction member is arranged on the X-advanced arm, and the X-advanced arm is capable of driving the extraction member to move in the X-axis direction; and an extraction handle 1112 extending to both sides is arranged at a lower end of the extraction member, as shown in FIG. 11, a receiving slot 1113 is formed on an upper end face of the tank cover 4000, the receiving slot 1113 is capable of receiving the extraction handle 1112 in the X-axis direction, and the extraction handle 1112 is capable of restricting the extraction of the receiving slot 1113 in the Z-axis direction.

When the second Z-direction extraction arm 113 drives or indirectly drives the extraction member 111 to reach an extraction position of the tank cover 4000, the extraction handle 1112 at the lower end of the extraction member is on a same horizontal line with the receiving slot 1113 in the X-axis direction, and the X-advanced arm drives the extraction member, that is, drives the extraction handle 1112, to move in the X-axis direction, such that the extraction handle 1112 is driven to enter the receiving slot 1113 in the X-axis direction; and since the extraction handle restricts the receiving slot in the Z-axis direction, the extraction handle is capable of extracting the tank cover in the Z-axis direction. Of course, the extraction process involves the first Z-direction extraction arm and the second Z-direction extraction arm driving the extraction handle to move up and down, and the receiving horizontal driving arm drives the extraction handle to move in the horizontal direction of the X-axis to enable the extracted tank cover to be placed in the target position.

For better storage or extraction of the tank cover, and for a more cost-effective, stable and reasonable structure, the extraction operation room in the present disclosure is provided with the X-direction pushing system 12, the X-direction pushing system 12 is capable of pushing the tank cover 4000 extracted by the multi-stage Z-direction extraction arm 11 to the target position; and a design structure is disclosed for the target position, that is, the tank cover storage area 13.

A preferred implementation of the X-direction pushing system 12 in this embodiment, the X-direction pushing system 12 includes an X-direction pushing member 121 and the tank cover storage area 13; the X-direction pushing member 121 and the tank cover storage area 13 are arranged relative to each other, and the term "arranged relative to each other" means that positions of the X-direction pushing member 121 and the tank cover storage area 13 arranged in the X-axis direction can achieve a purpose that the X-direction pushing member 121 is capable of pushing the tank cover 4000 or the storage box 1000 extracted by the extraction member 111 to the tank cover storage area 13; and of course, the X-direction pushing member 121 can be arranged in a position capable of pushing the tank cover extracted by the extraction member to the target position. Any implementation that the tank cover of the sample storage tank is opened, and placed in a position that does not obstruct further extraction of the lifting basket or the storage box are all fall within the aforesaid scope. Since the receiving slot of the extraction member is preferably disposed in a way that poses no limitations on receiving the extraction handle in the X-axis direction, the X-direction pushing member of the X-direction pushing system does not require additional complex arrangements in other directions, but only needs to meet the pushing requirements in the X-axis direction, greatly saving costs and space of structural design.

In a further preferred implementation of the X-direction pushing system 12 in this embodiment, the X-direction pushing system 12 further includes the X-direction pushing member 121 and the tank cover storage area 13; the X-direction pushing member 121 and the tank cover storage area 13 are arranged on both sides of the multi-stage Z-direction extraction arm 11 in the X-axis direction; and the X-direction pushing member 121 is capable of pushing the tank cover or the storage box extracted by the extraction member to the tank cover storage area or the target position;

the X-direction pushing member 121 includes a pushing base frame 122, a pushing drive motor 123, an X-axis moving push plate 124, and a pushing guide rod 125; the pushing base frame 122 is fixed below one side of the multi-stage Z-direction extraction arm 11, the pushing drive motor 123 and the pushing guide rod 125 are separately fixed on the pushing base frame 122, and the X-axis moving push plate 124 moves along the pushing guide rod 125 under the drive of the pushing drive motor 123; and the X-axis moving push plate 124 is capable of moving and extending from one side of the multi-stage Z-direction extraction arm 11 to the other side thereof, and is close to the tank cover storage area 13; and a reception and storage port 131 is formed on one side of the tank cover storage area 13 close to the X-axis moving push plate 124.

When it is necessary to extract the cryopreservation tube from the sample storage tank 2000, the multi-stage Z-direction extraction arm 11 firsts extracts the tank cover 4000 by using the extraction member to a position corresponding to the X-direction pushing member 121, the pushing drive motor 123 drives the X-axis moving push plate 124 to move on the pushing guide rod 125, the X-axis moving push plate 124 accordingly passes from one side of the multi-stage Z-direction extraction arm 11, and goes underneath the beneath of the multi-stage Z-direction extraction arm, and pushes the tank cover 4000 to the tank cover storage area 13 located on the other side of the multi-stage Z-direction extraction arm 11, such that the tank cover 4000 is pushed to the tank cover storage area 13, which not only realizes the extraction and storage of the tank cover, but also enables the multi-stage Z-direction extraction arm to extract the lifting basket or sample storage box from the sample storage tank. Of course, the reception and storage port is formed on one side of the tank cover storage area near the X-axis moving push plate, and the tank cover is pushed by the X-direction pushing member to the tank cover storage area and is received from the tank cover storage area.

Further, the multi-stage Z-direction extraction arm 11 and the X-direction pushing system 12 also include a Y-direction receiving system 14; and arrangement of the Y-direction receiving system 14 is a more reasonable and effective way to receive storage boxes delivered directly or indirectly by a transfer box. In a preferred implementation of this embodiment, the Y-direction receiving system 14 is capable of receiving the storage box 1000 and transporting the storage box to a position corresponding to the X-direction pushing system 12. The Y-direction receiving system 14 is arranged to receive the storage box 1000 in a Y-axis direction, such that the extraction operation room 1 can also be operated in the Y-axis direction, and facilitates the reception of storage box.

In a further preferred implementation of this embodiment, the Y-direction receiving system 14 includes Y-direction tracks 141, a Y-direction movable tray 142, and a storage box receiving channel 143; the Y-direction tracks 141 extend in the Y-axis direction and is arranged below the pushing base frame 122; the storage box receiving channel 143 is arranged on the Y-direction tracks 141 in a sliding manner, and the storage box receiving channel 143 has a certain length in the X-axis direction; and the Y-direction movable tray 142 is arranged in the storage box receiving channel 143 in the X-axis direction in a sliding manner.

The Y-direction receiving system 14 further includes a storage box pushing member 15, the storage box pushing member 15 is arranged in a position corresponding to the storage box receiving channel 143, and is capable of pushing the Y-direction movable tray 142 in the storage box receiving channel 143.

The storage box pushing member 15 includes a storage box pushing drive motor 151 and a storage box pushing plate 152, the storage box pushing drive motor 151 is arranged on a lower end face of the pushing base frame 122, the storage box pushing plate 152 is arranged on the lower end face of the pushing base frame 122 in a sliding manner, and the storage box pushing drive motor 151 drives the storage box pushing plate 152 to perform telescopic movements in the X-axis direction.

In this embodiment, the Y-direction movable tray 142 is configured to receive the storage box 1000, and further, an operating gripper 5000 can be arranged inside the extraction operation room, and is capable of gripping and transferring the target storage box 1000 onto the Y-direction movable tray 142; and other gripping methods can also be adopted, which are not limited herein. After the Y-direction movable tray 142 receives the target storage box, a driving member (which is definitely provided herein and will not be repeated) for driving the storage box receiving channel 143 is arranged; the storage box receiving channel 143 drives the Y-direction movable tray 142 to move in the Y-axis direction, and the target storage box is driven to a position corresponding to the storage box pushing member 15, and the storage box pushing drive motor 151 of the storage box pushing member 15 drives the storage box pushing plate 152 to push and transfer the target storage box in the X-axis direction to reach a destination.

Figure 4:
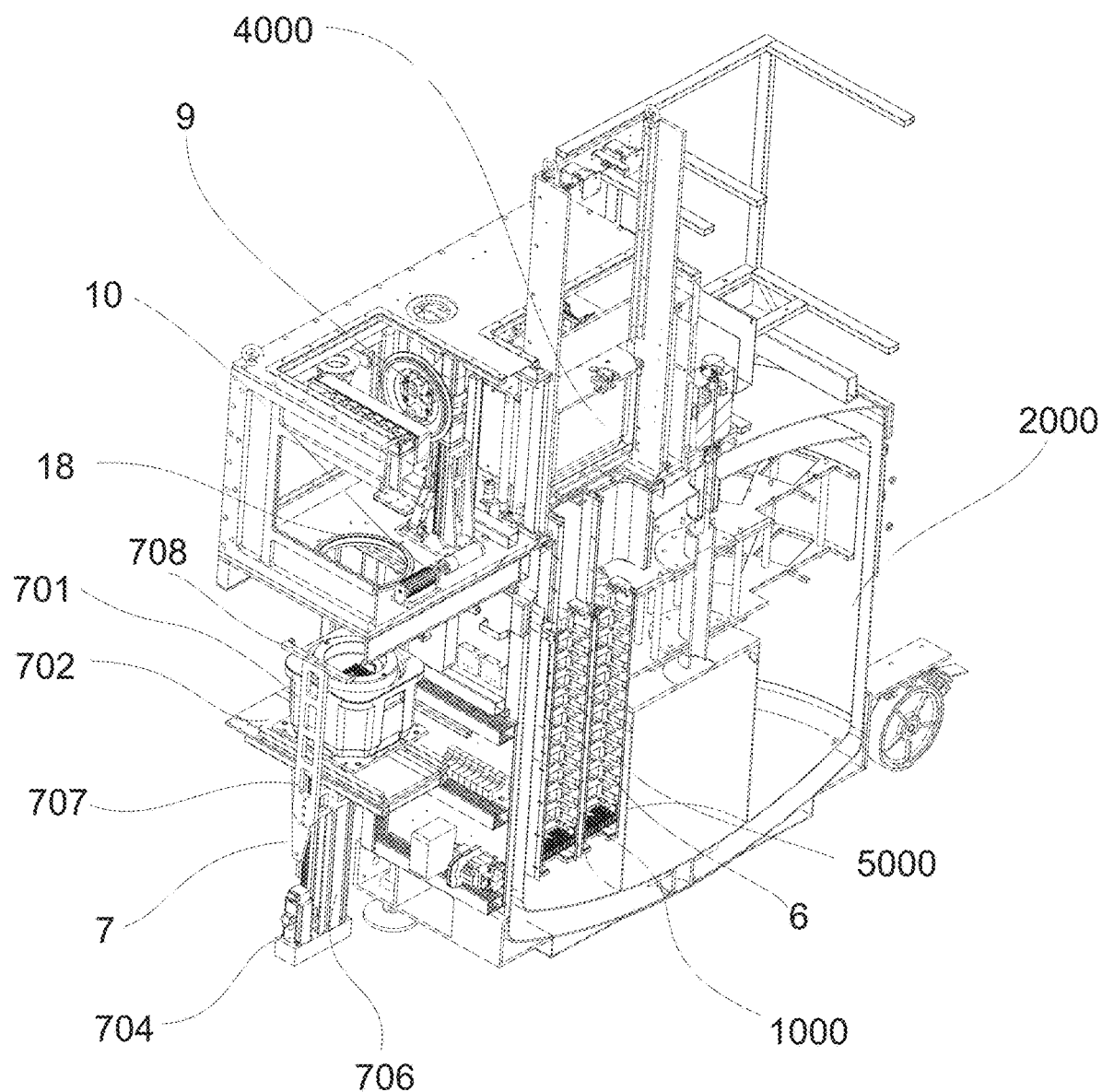
FIG. 4 is a semi-sectional view of FIG. 3.

The multi-stage Z-direction extraction arm 11 first extracts the tank cover 4000 of the sample storage tank 2000, the tank cover is then pushed by the X-direction pushing system 12 to the tank cover storage area 13, and the target storage box is pushed out by the storage box pushing plate 152; the multi-stage Z-direction extraction arm 11 repeats the same action and moves downwards, such that the extraction member 111 moves into the sample storage tank 2000 to extract the lifting basket 3000, the arrangement method of the extraction member has been described above, an upper end face of the lifting basket is also arranged in a manner of cooperating with the extraction member, and preferably, the upper end face of the lifting basket is arranged in the X-axis direction, and does not restrict the extraction of the extraction member, and a structural arrangement of the receiving slot 1113 that restricts the extraction handle 1112 in the Z-axis direction is same as that described above, which will not be repeated any more. The extraction member extracts the lifting basket to a position corresponding to the storage box pushing member 15, the storage box pushing drive motor 151 drives the storage box pushing plate 152 to move in the X-axis direction, and the target storage box is accordingly pushed out and fell into the lifting basket; and as shown in FIG. 4, the lifting basket disclosed herein is formed by a plurality of vertically aligned lifting basket receiving trays 6 vertically arranged that can be received in the X-axis direction, and the storage box pushing plate pushes the storage box 1000 into the target lifting basket receiving tray 6. After the lifting basket receives the target lifting basket receiving tray 6, the multi-stage Z-direction extraction arm 11 drives the lifting basket down to an initial state, achieving the purpose of storing and accessing the target storage box.

In a further preferred implementation of the storage box pushing plate 152 in this embodiment, the storage box pushing plate 152 includes a first storage box pushing sub-plate 153, a second storage box pushing sub-plate 154, and a storage box pushing head 155, an upper end face of the first storage box pushing sub-plate 153 is arranged on the lower end face of the pushing base frame 122 in a sliding manner, one end of the first storage box pushing sub-plate 153 is fixed at a right angle with one end of the second storage box pushing sub-plate 154, the other end of the second storage box pushing sub-plate 154 is fixed at a right angle with the storage box pushing head 155, and the storage box pushing plate 152 is shaped like an inverted "Z", such that the X-direction pushing system 12 and the storage box pushing member 15 are arranged together in a reasonable manner, featuring a compact structure that better matches the pushing operation of the X-direction pushing system 12 and the storage box pushing member 15.

In still a further preferred implementation of the Y-direction receiving system 14 in this embodiment, the Y-direction receiving system 14 also includes a Y-direction driving motor 144, a Y-direction rotating shaft screw 145, and a storage box receiving channel engaging nut 146; the Y-direction driving motor 144 drives one end of the Y-direction rotating shaft screw 145 to rotate, and the other end of the Y-direction rotating shaft screw 145 is rotationally arranged at one end of the Y-direction tracks 141 away from the pushing base frame 122.

The storage box receiving channel engaging nut 146 is fixed at one end of the storage box receiving channel 143, and the Y-direction rotating shaft screw 145 is engaged with the storage box receiving channel engaging nut 146; and
the Y-direction driving motor is arranged below a connection between the first storage box pushing sub-plate and the second storage box pushing sub-plate, and the storage box receiving channel is capable of moving to a position corresponding to the storage box pushing head.

The Y-direction driving motor 144 drives the Y-direction rotating shaft screw 145 to rotate, the storage box receiving channel engaging nut 146 is accordingly driven to move linearly along the Y-direction rotating shaft screw 145 in the Y-axis direction, the storage box receiving channel 143 is then driven to move linearly in the Y-axis direction, such that after receiving the target storage box, the Y-direction movable tray 142 drives the target storage box to move in the Y-axis direction, and moves to the position corresponding to the storage box pushing head 155, and the storage box pushing head 155 then pushes the target storage box to fall into the lifting basket.

In order to further improve the stability of the target storage box in the low-temperature environment during the extraction process, this embodiment further provides a preferred implementation, that is, the Y-direction receiving system 14 further includes a cryogenic protection member 16, the cryogenic protection member 16 is arranged beneath the storage box receiving channel 143 or fixed to a lower end face of the storage box receiving channel 143; an accommodating cavity is formed inside the cryogenic protection member, a plurality of nitrogen ports 161 communicating with the accommodating cavity are formed on an upper end face of the cryogenic protection member, and the accommodating cavity is also communicated with a nitrogen supply pipeline, such that the nitrogen supply pipeline is capable of supplying nitrogen to the accommodating cavity of the cryogenic protection member, and nitrogen liquid thus overflows from the nitrogen ports to continuously guarantee low temperature of the storage box receiving channel.

Figure 2:
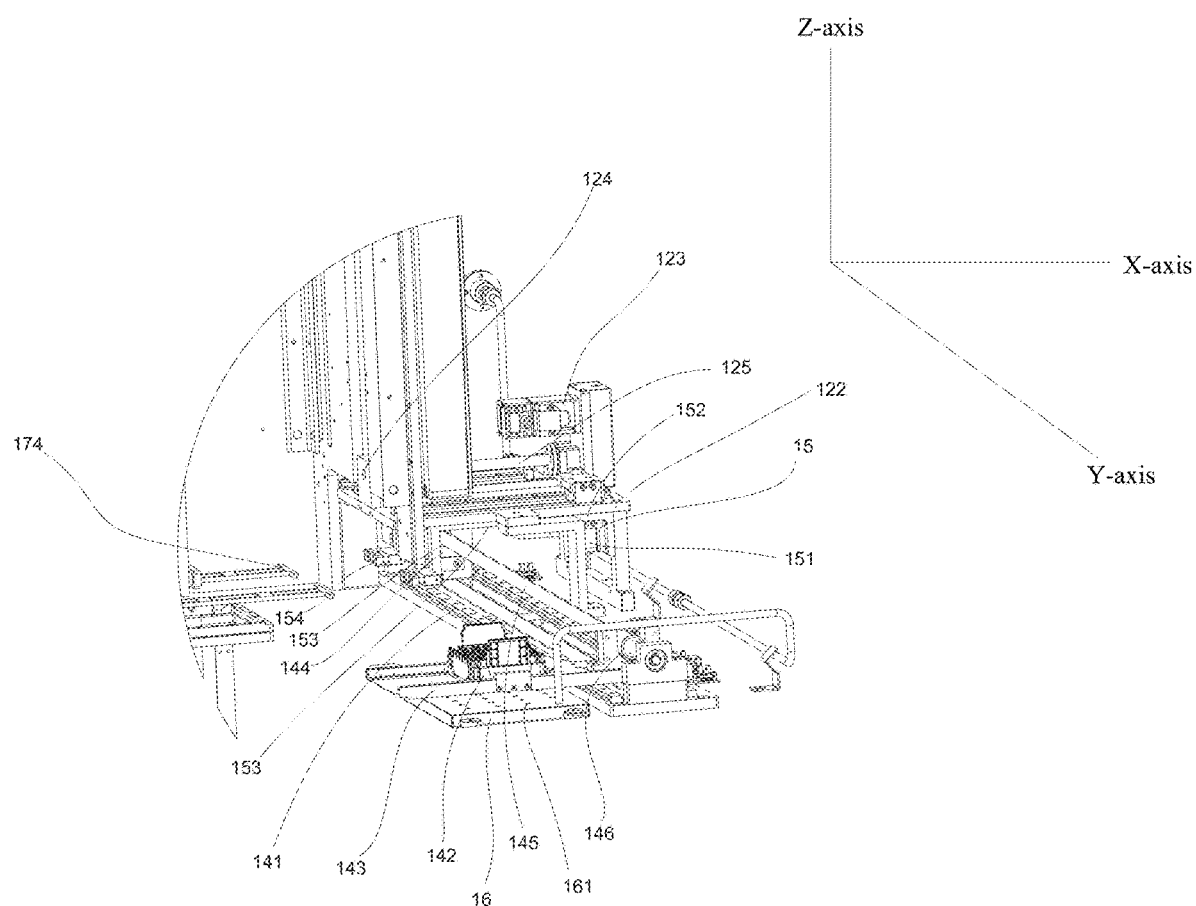
FIG. 2 illustrates an X-direction pushing system and a storage box pushing member (partial enlargement of FIG. 1).
Figure 3:
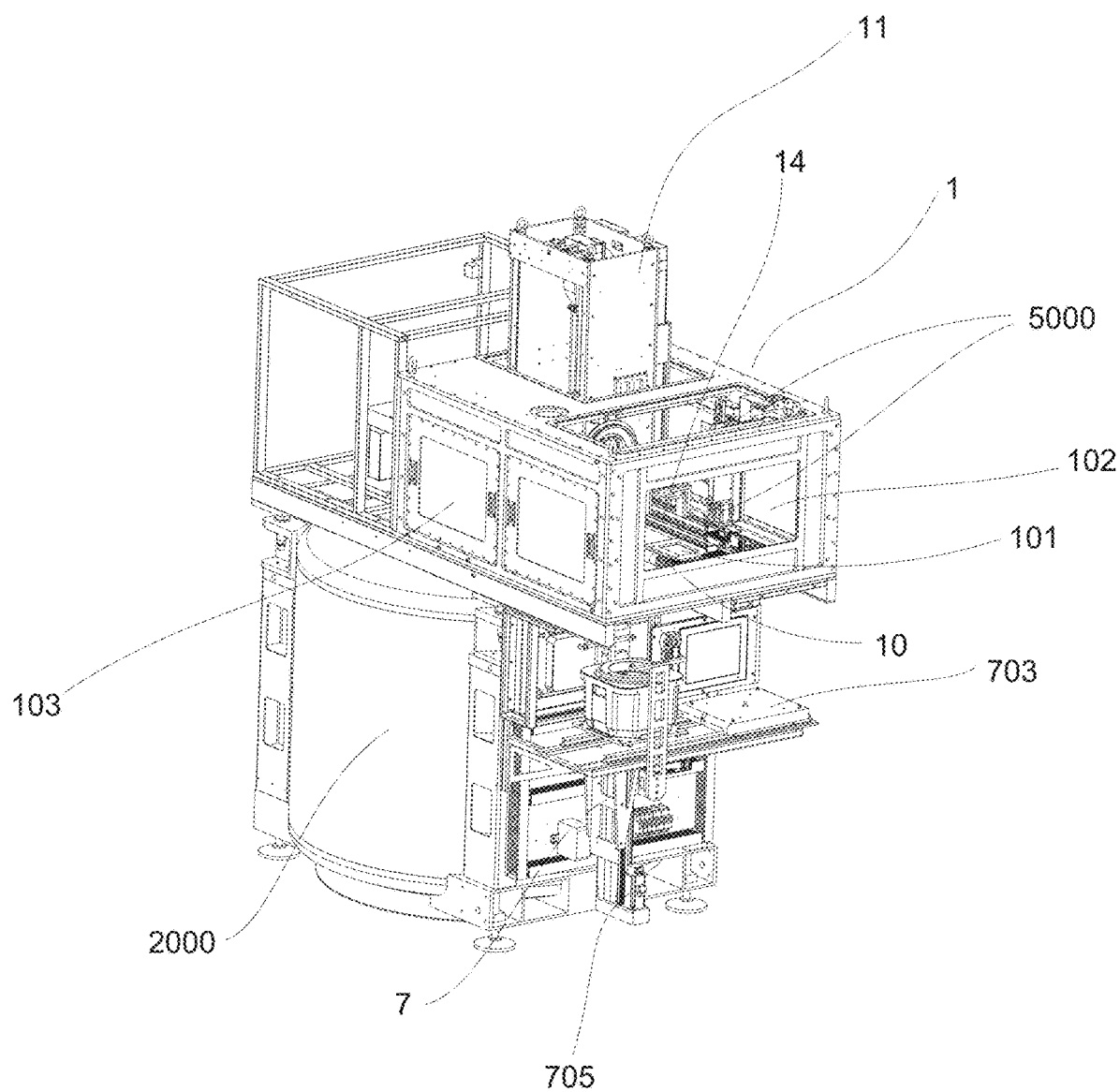
FIG. 3 is a structural schematic diagram of an intelligent sample access system.

In still a further preferred implementation of this embodiment, the cryogenic protection member is box-shaped, cylindrical, or hemispherical, a specific structure of the cryogenic protection member is not limited herein, one structure is shown in FIG. 2, a rectangular box body is provided, and the storage box receiving channel is arranged on the rectangular box body.

This embodiment further discloses a preferred implementation of the tank cover storage area, where the tank cover storage area 13 includes a tank cover storage shell 132 and a tank cover storage driving member 133, the reception and storage port 131 is formed on one side of the tank cover storage shell 132 close to the X-direction pushing member 121, and a tank cover extraction port 134 is formed on an end face of the tank cover storage shell 132 close to the extraction member; and
the tank cover storage driving member 133 is capable of driving the tank cover storage shell 132 to move in the X-axis direction. In order to cooperate with the X-direction pushing system 12 to make the tank cover storage area receive the tank cover more stably, the tank cover storage driving member is provided to drive the tank cover storage shell to move in the X-axis direction.

Specifically, in an implementation of the tank cover storage driving member 133, the tank cover storage driving member 133 includes a storage drive base 135, a storage drive track 136, and a storage drive linking plate frame 137; and
the storage drive base 135 is fixed inside the extraction operation room and is located below the other side of the multi-stage Z-direction extraction arm 11; the storage drive track 136 is arranged on the storage drive base 135; and one end of the storage drive linking plate frame 137 is arranged on the storage drive track 136 in a sliding manner, and the other end thereof is fixed on the tank cover storage shell 132.

The storage drive base 135 is arranged above the tank cover storage shell 132, a first storage sub-drive track 138 and a second storage sub-drive track 139 are symmetrically arranged on both sides of an upper end face of the storage drive base 135;
two rows of driving channels 1310 are arranged on the two sides of the first storage sub-drive track 138 and the second storage sub-drive track 139 at the upper end face of the storage drive base in the X-axis direction; and
the storage drive linking plate frame 137 includes a storage drive sliding plate 1311, a first storage drive clamping plate 1312, and a second storage drive clamping plate 1313; the storage drive sliding plate 1311 is arranged on the first storage sub-drive track 138 and the second storage sub-drive track 139 in a sliding manner; an upper end of the first storage drive clamping plate is vertically fixed on one side of the storage drive sliding plate, and a lower end of the first storage drive clamping plate passes through the driving channels on one side and is fixed on tank cover storage shell; and an upper end of the second storage drive clamping plate is vertically fixed to the other side of the storage drive sliding plate, and a lower end of the second storage drive clamping plate passes through the driving channels on the other side and is fixed on tank cover storage shell.

The storage drive base 135 is arranged above the tank cover storage shell 132, such that the tank cover storage shell is capable of being better aligned with the X-direction pushing system; a storage drive motor is arranged on the storage drive base, the storage drive motor drives the storage drive sliding plate to move in the X-axis direction, such that the first storage drive clamping plate and the second storage drive clamping plate are driven to move in X-axis direction, and the tank cover storage shell is accordingly driven to move in the X-axis direction. Since an upper end of the first storage drive clamping plate is vertically fixed on one side of the storage drive sliding plate, and the lower end of the first storage drive clamping plate passes through the driving channels on one side and is fixed on tank cover storage shell, an overall structure is more compact and stable, and the tank cover storage shell becomes more stable and can better cooperate with the X-direction pushing system and the extracted tank cover.

In still a further preferred implementation of this embodiment, the extraction operation room 1 further includes a storage box returning member 17; and the storage box returning member 17 is arranged in a position opposite to the storage box pushing plate 152; and the storage box returning member 17 includes a returning push plate 171, and the returning push plate 171 is capable of performing telescopic movements in the X-axis direction.

The storage box returning member 17 further includes a returning member base plate 172 and a returning member drive motor 173; and
the returning member base plate 172 is arranged below the tank cover storage shell 132 and in a position opposite to the storage box returning member 17, the returning push plate 171 is slidably arranged on the returning member base plate 172 under the drive of the returning member drive motor 173, and a returning pushing head 174 is arranged on one side of the returning push plate 171 close to the storage box pushing head 155.

The process of extracting a storage box from the sample storage tank is further described as follows: first, the multi-stage Z-direction extraction arm and the X-direction pushing system extract the tank cover of the sample storage tank and place the tank cover in the tank cover storage area; the multi-stage Z-direction extraction arm then extracts the lifting basket to the target position, and the "target position" stated herein means a position that a storage box storage stack where the target storage box is located driven by the lifting basket is extracted to a position corresponding to the returning pushing head, in which case, the returning member driving motor drives the returning push plate to move towards the target storage box in the X-axis direction, and the target storage box is then pushed onto the Y-direction movable tray through the returning pushing head, before that the Y-direction movable tray has been driven to the position corresponding to the returning pushing head of the storage box returning member; after receiving the target storage box, the Y-direction movable tray drives the target storage box to a position easily to be grasped by the operating gripper through movements of the storage box receiving channel on the Y-axis direction, the operating gripper then grasps the target storage box and put the same to the transfer box for transferring; and when the target storage box is put into the transfer box, a transfer box cover that was previously opened is closed by the cover opening mechanism onto the transfer box for sealing.

After the multi-stage Z-direction extraction arm and the storage box returning member have extracted the target storage box, the multi-stage Z-direction extraction arm puts the lifting basket back into the sample storage tank, and the tank cover is then extracted and closed onto the sample storage tank, and an operation process of extracting and closing the tank cover is as follows: since a tank cover extraction port is formed on an end face of the tank cover storage shell close to the extraction member, that is, the tank cover extraction port is formed on the upper end face of the tank cover storage shell, when the tank cover needs to be closed, the extraction member first moves to a position corresponding to the tank cover in the horizontal direction of the X-axis, that is, the extraction handle of the extraction member and the receiving slot of the tank cover are in corresponding positions of the in the horizontal direction of the X-axis, in which case, the tank cover storage driving member drives the tank cover storage shell to move towards the extraction member, such that the tank cover on the tank cover storage shell is driven to move in the X-axis direction until the extraction handle is driven to move and be aligned with the receiving slot, making the extraction member easy to extract the tank cover of the sample storage tank in the Z-axis direction; after the extraction handle is aligned with the receiving slot, the tank cover storage driving member drives the tank cover storage shell to return in the original path; driven by the multi-stage Z-direction extraction arm, the extraction member brings the tank cover back to the sample storage tank to close it, such that the entire process is completed; and of course, during and after storing and accessing the storage box, an operation process of having the tank cover closed is the same.

Embodiment 2

In the prior art, the sample access systems are not only unreasonable in design of extraction structures of the sample storage tanks through the storage and access process and are also costly, but also unable to connect a plurality of devices, which prevents the formation of a sample library industrial access line, and furthermore, the full cold chain cannot be guaranteed throughout the entire industrial access line process.

This embodiment provides an intelligent sample access system, including a transfer docking member 7, any extraction operation room 1 as described in Embodiment 1 and the sample storage tank 2000 described in Embodiment 1; the extraction operation room 1 is sealed and arranged at an upper end of the sample storage tank 2000; a sealing docking port 18 is formed on the extraction operation room, the transfer docking member 7 is arranged on an outer side of the sample storage tank 2000, the transfer docking member 7 is capable of receiving the transfer box 701, and driving the transfer box 701 to have an opening of the transfer box docked with the sealing docking port 18.

A transfer process of this embodiment is as follows: when a biological sample needs to be extracted from the sample storage tank, specifically, a cryopreservation tube containing the biological sample needs to be placed into the storage box, and the storage box is then placed in the transfer box for transfer, as the transfer box itself has a function of keeping cold, a low-temperature environment is thus guaranteed during the process. The transfer box is moved to the transfer docking member, which is configured to transfer the transfer box, such that the opening of the transfer box is docked with the sealing docking port of the extraction operation room; and the extraction operation room then has the transfer box opened inside the extraction operation room, and performs the extraction of the target storage box. The sealing docking port is provided with a sealing strip, and the opening of the transfer box is further provided with a sealing strip capable of being docked and sealed with the sealing strip of the sealing docking port, when the two sealing strips are docked, sealing is achieved to guarantee the stability of the low-temperature environment Throughout the entire process, the target storage box is always in a low-temperature environment both inside the transfer box, and inside the operation extraction room with the cover opened. Moreover, it is very convenient to form a plurality of the sample storage tanks for docking and extraction due to the arrangement of the transfer docking member, and the cold preservation is realized throughout the process.

The plurality of the sample storage tanks form a sample access industrial line, and each of the sample storage tanks is provided with the extraction operation room as described in Embodiment 1; and in order to allow for direct extraction, transfer or storage of the entire industrial line in a deep low-temperature environment, realize intelligent management of the industrial line, and facilitate the extraction and docking between two or more sample storage tanks, the transfer docking member is arranged to make the beneficial effects more helpful. A preferred implementation of the transfer docking member 7 is provided in this embodiment, the transfer docking member 7 includes moving tracks 702, a mobile trolley 703, and a docking driving member 704; the moving tracks 702 are arranged on the outer side of the sample storage tank 2000, the mobile trolley 703 is arranged on the moving tracks 702, and the mobile trolley 703 is capable of driving the transfer box to move along the moving tracks 702; and the transfer docking member 7 is capable of driving the transfer box, such that the opening of the transfer box is docked with the sealing docking port, in which case, the target storage box inside the transfer box can be sealed and extracted through the extraction operation room, and a cold chain state of the entire process is guaranteed, therefore, it is unnecessary to have the transfer docking member arranged in a very complicated way, and nor is it necessary to provide a sealing structural environment for the transfer docking member as a whole, as when two or more sample storage tanks need to be docked, the transfer docking member is arranged between them, such that the purpose of the full cold chain can be achieved throughout the process.

In still a further preferred implementation of this embodiment, as shown in FIG. 4, the moving tracks 702 are C-shaped, U-shaped or concave, such that the sample storage tank is directly extracted or storage in a convenient manner, and the moving tracks that are in C-shaped, U-shaped or concave is more convenient having two or more sample storage tanks docked.

In still a further preferred implementation of this embodiment, the docking driving member 704 includes a docking drive motor 705, vertical docking tracks 706, and docking lifting frames 707; and the docking drive motor 705 drives the docking lifting frames 707 to move up and down along the vertical docking tracks 706;

the moving tracks 702 are arranged at upper ends of the vertical docking tracks 706, forming a T-shape or an inverted L-shape; and one end of each of the moving tracks 702 passes through the docking lifting frames 707; and upper ends of the docking lifting frames 707 are two non-connected free ends, and each of the free ends is provided with a lifting receiving plate 708; a lifting support plate 709 is arranged between the two lifting receiving plates 708; and the transfer box 701 can be placed or arranged on the lifting support plate 709.

Figure 5:
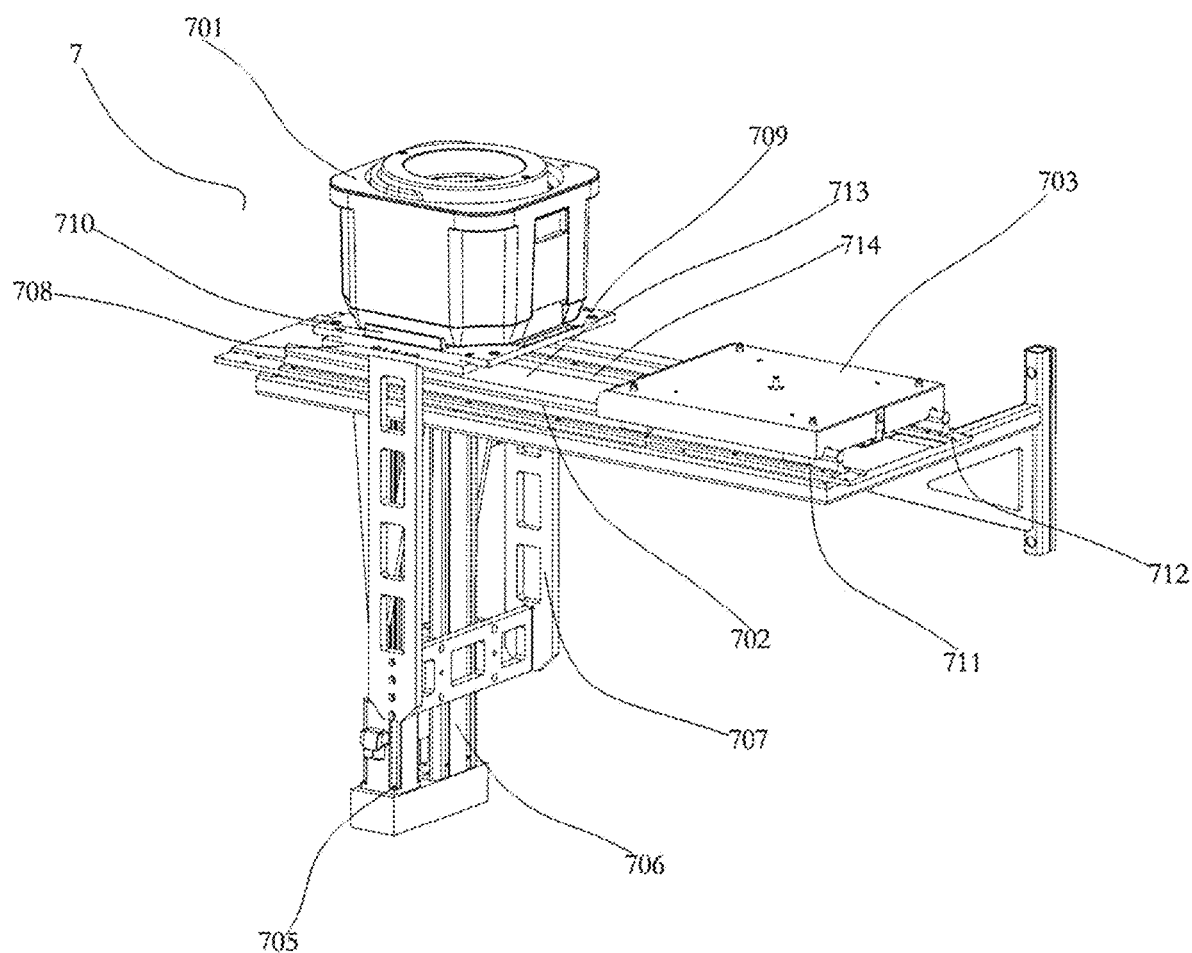
FIG. 5 is a structural schematic diagram of a transfer docking member.
Figure 6:
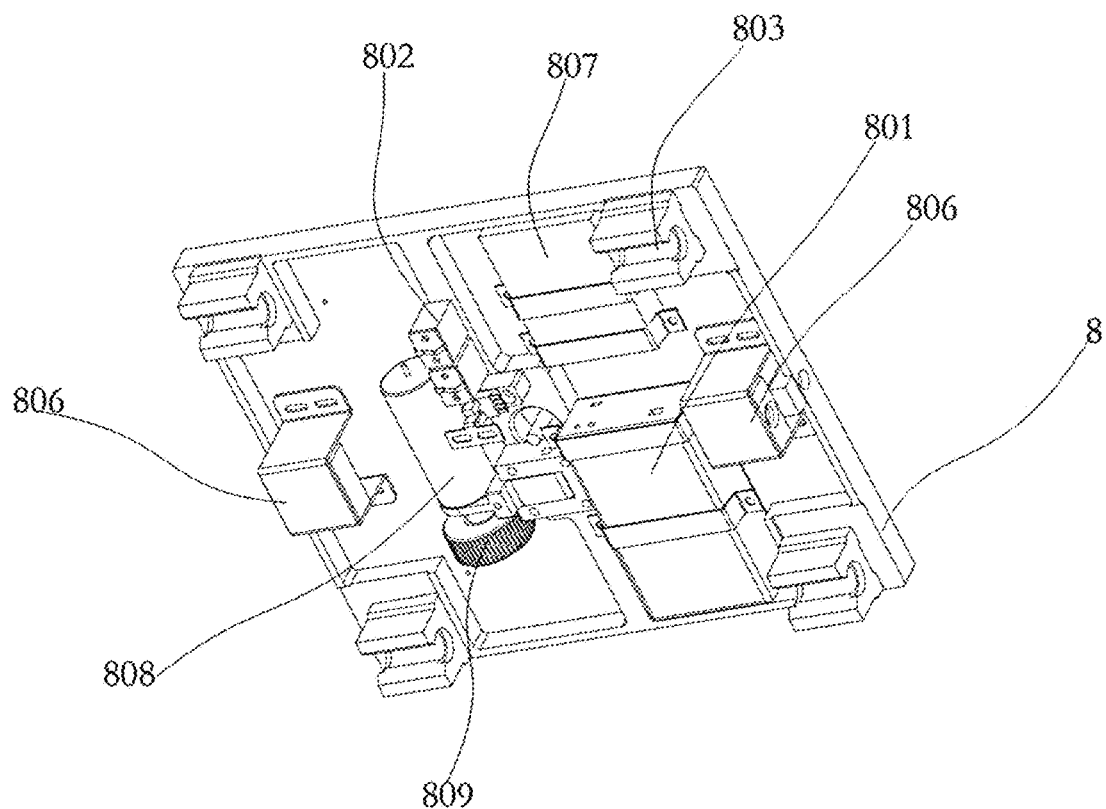
FIG. 6 is a structural schematic diagram of a mobile trolley.
Figure 7:
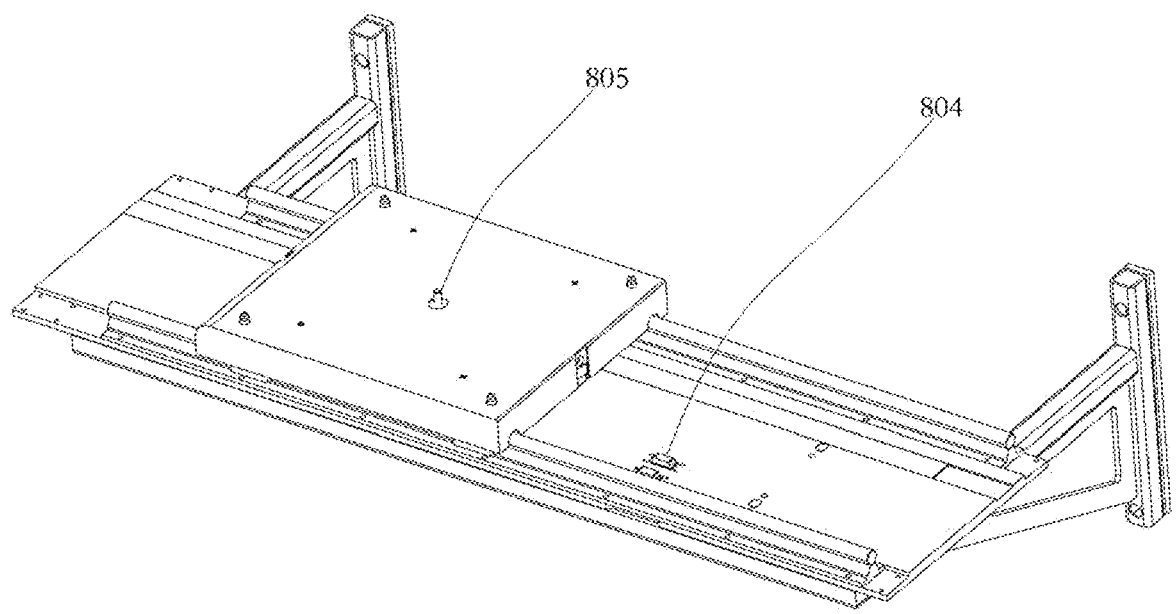
FIG. 7 is a structural schematic diagram of a mobile track on moving tracks.

As shown in FIG. 5, in the initial state, the lifting support plate 709 is in a position convenient for receiving the transfer box; when the transfer box is moved and placed on the lifting support plate, the docking drive motor drives the docking lifting frames to move up and down on the vertical docking track, such that the lifting support plate is driven to move upwards, and the transfer box is driven to be docked with the sealing docking port of the extraction operation room; and since the upper ends of the docking lifting frames are two non-connected free ends, heights of the free ends are higher than the moving tracks, such that the lifting support plate is higher than the moving tracks. The lifting support plate is arranged on the lifting receiving plates of the two non-connected free ends, and the two lifting receiving plates are configured to support the lifting support plate in a vertical direction, but do not restrict the movement of the lifting support plate driven by the mobile trolley on the moving tracks. When it is inconvenient to place the transfer box transferred from outside directly in a position corresponding to the docking lifting frames, the lifting support plate can be moved to an appropriate position by using the mobile trolley, after the transfer box is placed on the lifting support plate, the lifting support plate carrying the transfer box is moved to the two lifting receiving plates by using the mobile trolley, and the lifting receiving plates are capable of completing a sealing and docking action.

In still a further preferred implementation of this embodiment, a transfer box limiting plate 710 is arranged on the lifting support plate 709, and the transfer box limiting plate 710 is capable of limiting the transfer box, such that the lifting support plate is capable of receiving the transfer box more precisely.

In a preferred implementation of the automatically rechargeable mobile trolley 703 in this embodiment, the mobile trolley includes a trolley base 8, a trolley battery 801, and a contact pad connection plate 802;

trolley sliding grooves 803 are formed on an end face of the trolley base 8, the trolley sliding grooves 803 are slidably arranged on the moving tracks 702; the trolley battery 801 is arranged at a lower end of the trolley base 8, and the trolley battery 801 is electrically connected to the contact pad connection plate 802; and a power contact plate 804 is arranged on the moving tracks 702 and in a position below the trolley base and corresponding to the contact pad connection plate.

A trolley positioning column 805 is arranged on an upper end face of the trolley base; and a positioning hole corresponding to the trolley positioning column 805 is formed on the lifting support plate 709. When the mobile trolley needs to move alone, the lifting support plate 709 can be driven by the docking drive motor to raise a certain distance, such that the trolley positioning column is disengaged from the positioning hole on the lifting support plate, the mobile trolley accordingly slides on the moving tracks through the trolley sliding grooves, and the contact pad connection plate electrically connected to the trolley battery at the lower end of the trolley base is electrically connected to the power contact plate; and the power contact plate itself is connected to a power supply structure, such that the trolley battery can be charged through the power contact plate.

In a preferred implementation in this embodiment, the mobile trolley also includes a distance sensor 806, a microcontroller 807, a trolley motor 808, and trolley wheels 809, the distance sensor 806 is arranged on the lower end face of the trolley base 8; and the microcontroller is electrically connected to both the distance sensor and the trolley motor, and the microcontroller is configured to control the distance sensor and the trolley motor; and the trolley motor is configured to drive the trolley wheels to move on the moving tracks. The distance sensor is capable of measuring a movement position of the mobile trolley, making a movement distance of the mobile trolley more accurate; and the trolley motor drives the trolley wheels to move on the moving tracks, such that the mobile trolley realizes the movement on the moving tracks.

In still a further preferred implementation in this embodiment, the moving tracks 702 includes a first sub-track 711, a second sub-track 712, and the mobile trolley support plate 713; the first sub-track and the second sub-track are symmetrically arranged on both sides of an upper end face of the mobile trolley support plate 713; and two sets of the trolley sliding grooves are formed on two sides of the lower end face of the trolley base, and the two sets of the trolley sliding groove are slidably arranged on the first sub-track and the second sub-track, respectively;
  the power contact plate 804 is arranged on the mobile trolley support plate; and
  wheel pads 714 are arranged on the mobile trolley support plate, and the trolley wheels move on the wheel pads 714.

In still a further preferred implementation in this embodiment, the trolley positioning column is fixedly arranged on an upper end face of the trolley base of the mobile trolley; and a positioning hole corresponding to the trolley positioning column is formed on the lifting support plate.

The present disclosure provides a cover opening mechanism 9 of the extraction operation room 1, the extraction operation room 1 further includes the cover opening mechanism 9, where the cover opening mechanism 9 is arranged in a position corresponding to the sealing docking port, and the cover opening mechanism is capable of opening a transfer box cover on the opening of the transfer box docked with the sealing docking port.

In a further preferred implementation in this embodiment, the cover opening mechanism includes a cover-opening fixed base 901, a cover-opening drive member 902, a cover-opening large arm rod 903, a cover-opening small arm rod 904, and a cover-opening disk 905;
  the cover-opening fixed base 901 is fixed inside the extraction operation room, and the cover-opening drive member 902 is arranged on the cover-opening fixed base 901; one end of the cover-opening large arm rod 903 is rotationally arranged on the cover-opening fixed base, one end of the cover-opening small arm rod is rotationally arranged on the other end of the cover-opening large arm rod, and the cover-opening disk 905 is fixedly arranged on the other end of the cover-opening small arm rod; and the cover-opening drive member 902 drives the cover-opening large arm rod to rotate.

The cover-opening disk includes a cover-opening body disk, a cover-opening positioning rod 906, and cover-opening electromagnetic members 907;
  the cover-opening body disk is fixed at the other end of the cover-opening small arm rod, and the cover-opening positioning rod and a cover-opening electromagnetic positive member are arranged on the cover-opening body disk; and
  a transfer box positioning hole is formed on the transfer box cover, and the cover-opening positioning rod is capable of being inserted into the transfer box positioning hole; and an electromagnetic negative member of the transfer box cover is arranged on the transfer box cover, and the cover-opening electromagnetic positive member is capable of being adsorbed with the electromagnetic negative member of the transfer box cover.

The cover-opening drive member drives the cover-opening small arm rod, one end of the cover-opening small arm rod is rotationally arranged on the other side of the cover-opening large arm rod, one end of the cover-opening large arm rod is rotationally arranged on the cover-opening fixed base, therefore, when the cover-opening drive member performs a driving action, the cover-opening body disk is driven to move on the transfer box cover, the cover-opening positioning rod arranged on the cover-opening disk is then inserted into the cover-opening positioning hole, and the cover-opening electromagnetic positive member is adsorbed with the electromagnetic negative member of the transfer box cover, such that the transfer box cover is opened through movements of the cover-opening large arm rod and the cover-opening small arm rod; when the transfer box cover needs to be closed onto the transfer box, the cover-opening large arm rod and the cover-opening small arm rod move to drive the transfer box cover to be closed onto the transfer box, and the cover-opening electromagnetic positive member is then powered off, such that the cover-opening electromagnetic members realize the closing and opening of the transfer box cover.

Figure 8:
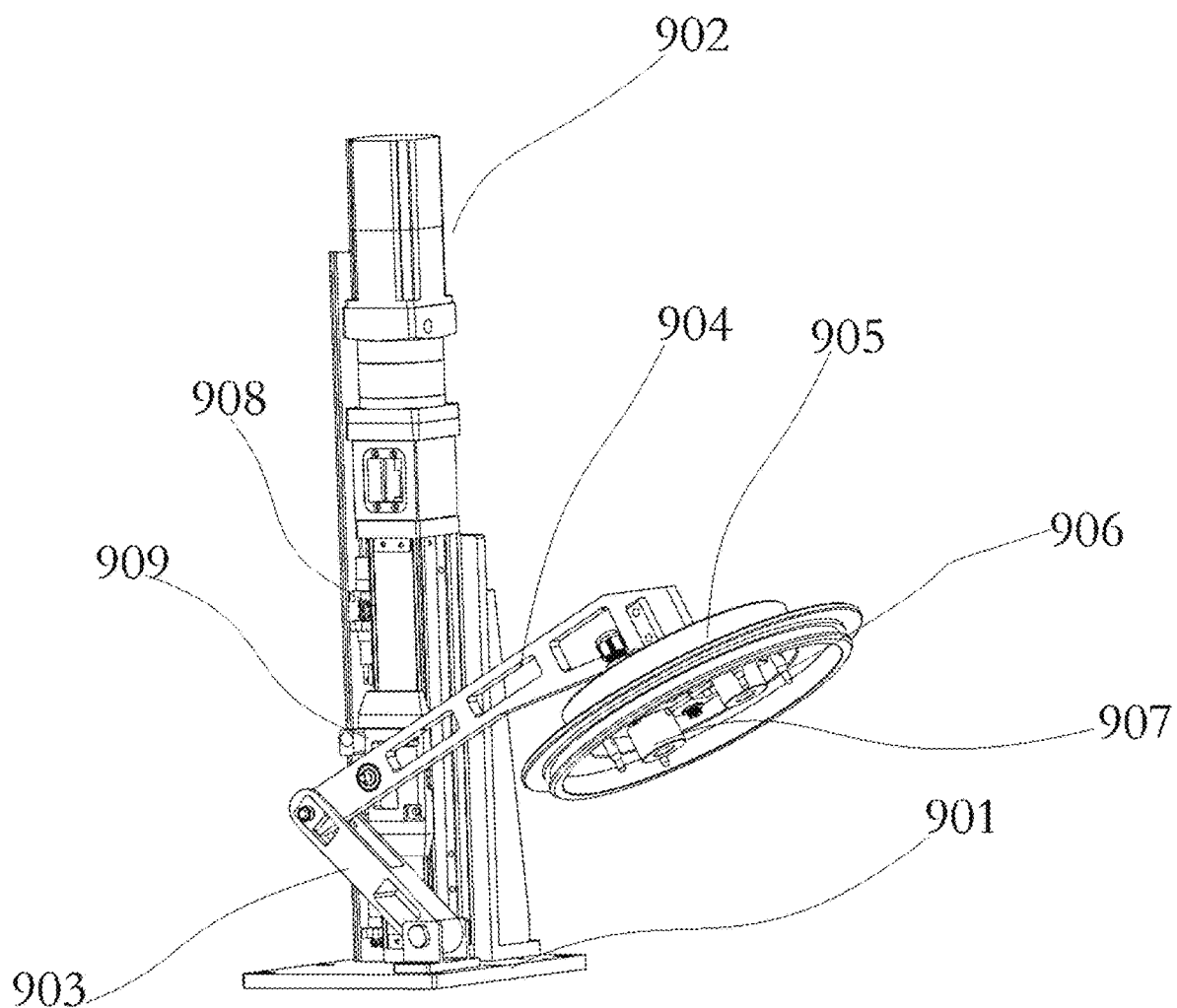
FIG. 8 is a structural schematic diagram of a cover opening mechanism.
Figure 9:
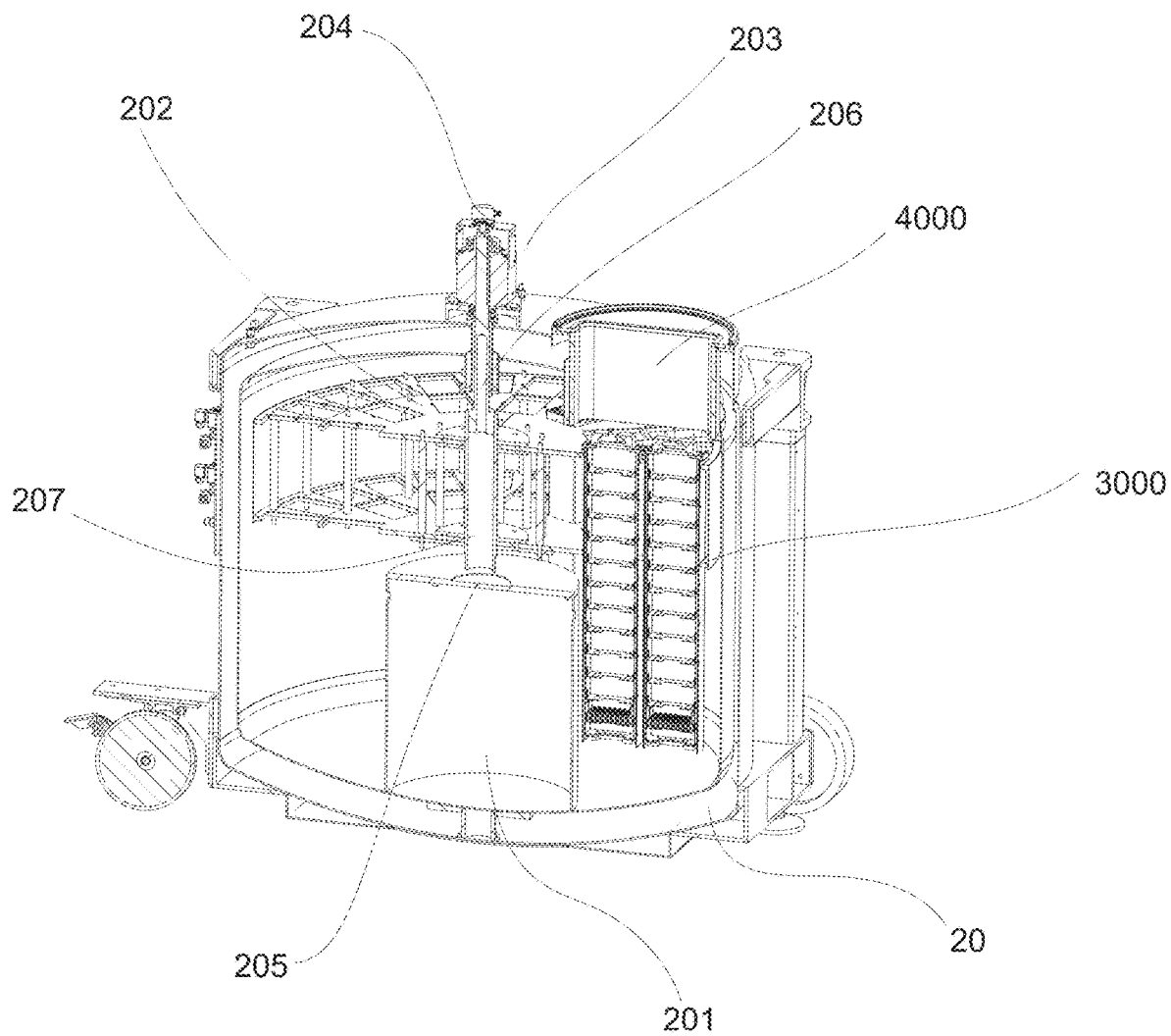
FIG. 9 is a schematic diagram a cross-sectional structure of a sample storage tank
Figure 10:
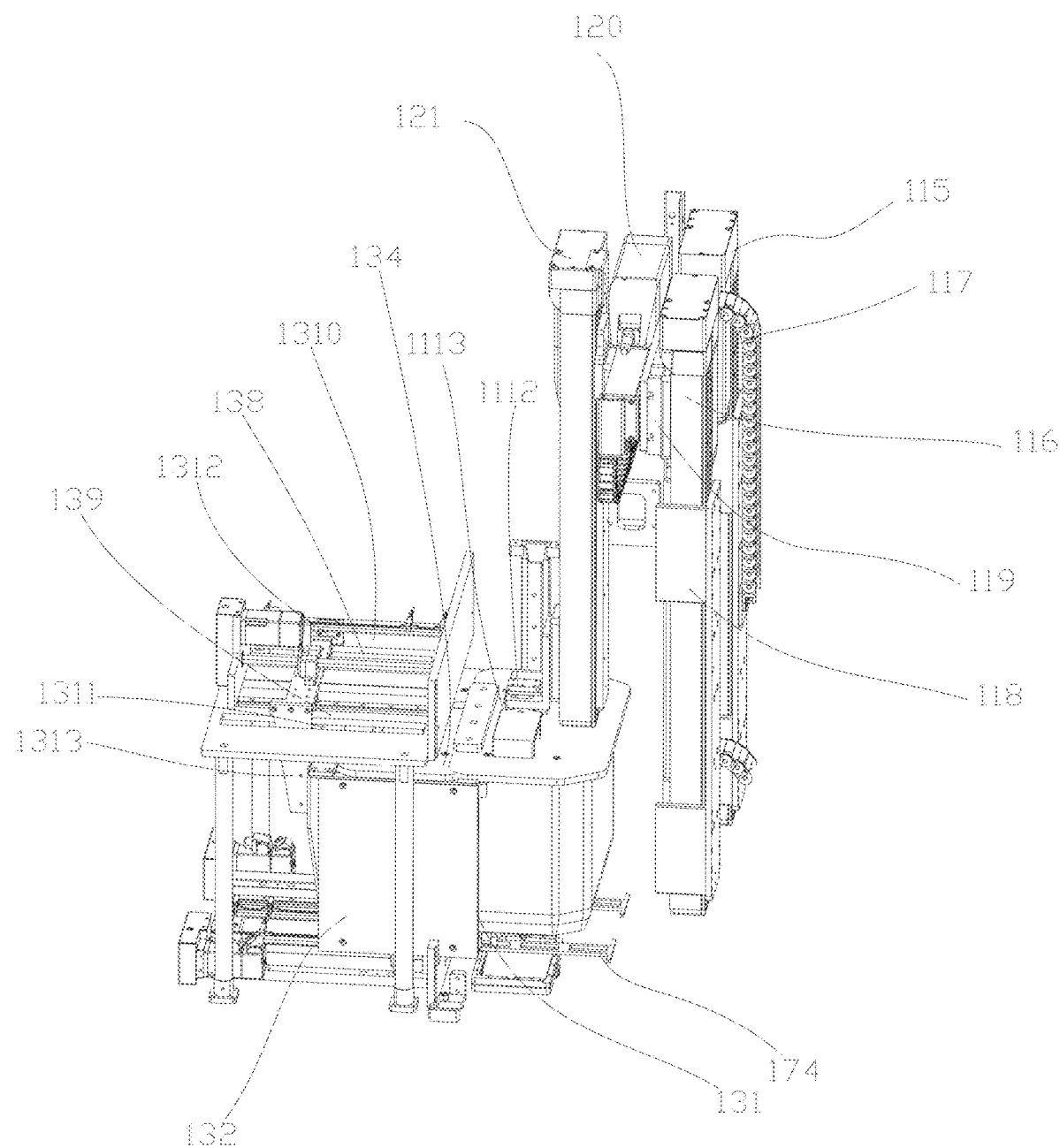
FIG. 10 is a structural schematic diagram of a multi-stage Z-direction extraction arm and a tank cover storage area.

In still a further preferred implementation in this embodiment, the cover-opening drive member 902 includes a cover-opening drive motor, a cover-opening drive guide rail 908, and a cover-opening drive sliding base 909; and
  the cover-opening drive motor drives the cover-opening drive sliding base 909 to move up and down along the cover-opening drive guide rail 908, one end of a cover-opening rotating shaft is fixed on the cover-opening drive sliding base, and the other end of the cover-opening rotating shaft is rotationally or fixedly arranged on the cover-opening small arm rod. As shown in FIG. 8, the cover-opening drive motor drives the cover-opening drive sliding base 909 to move up and down on the cover-opening drive guide rail, such that the cover-opening small arm rod and the cover-opening large arm rod are driven to rotate directly, the cover-opening large arm rod is driven to on the cover-opening fixed base, and movements of the cover-opening disk are thus realized.

In still a further preferred implementation in this embodiment, a sample storage tank is provided, the sample storage tank 2000 includes a sample tank body 20, a built-in liquid nitrogen tank body 201, a turntable 202, a sample storage rotating shaft member 203, a sample storage motor 204, the lifting basket 3000, and the tank cover 4000;
  an upper end face of the sample tank body is covered with the tank cover;
  the built-in liquid nitrogen tank body is arranged inside the sample tank body, and a receiving rotary groove 205 is formed on an upper end face of the internal liquid nitrogen tank body; and
  the sample storage motor drives the sample storage rotating shaft member to rotate, and a lower end of the sample storage rotating shaft member is rotationally arranged on the receiving rotary groove 205; a turntable is fixedly arranged on a periphery of the sample storage rotating shaft member; the lifting basket is arranged on the turntable; and when it is necessary to extract the target storage box, the sample storage motor drives the sample storage rotating shaft member to rotate, the turntable is thus driven to rotate, and the lifting basket with the target storage box is driven to rotate below the tank cover for easy extraction.

The sample storage rotating shaft member includes a central rotating shaft 206 and a receiving rotary shaft 207; the sample storage motor drives the central rotating shaft, the central rotating shaft contains a nitrogen filling chamber, and a lower end of the central rotating shaft is coaxially connected to the receiving rotary shaft, and a lower end of the receiving rotary shaft is rotationally arranged in the receiving rotary groove. The nitrogen filling chamber is filled with liquid nitrogen, such that an additional layer of cold preservation structure is further provided.

In still a further preferred implementation in this embodiment, an insulating layer is arranged on a tank wall inside the sample tank body.

In still a further preferred implementation in this embodiment, the extraction operation room is also provide with a defrosting mechanism 10 and a barcode scanning and recognition device 101, the defrosting mechanism is arranged near the sealing docking port, and the barcode scanning and recognition device is arranged near the defrosting mechanism. As shown in FIG. 4, the defrosting mechanism 10 includes a defrosting drive motor and a defrosting brush; when defrosting is required, the defrosting drive motor drives the defrosting brush to rotate, the operating gripper grips the storage box to the defrosting brush, enabling the defrosting brush to defrost the storage box; and after defrosting, the operating gripper moves the defrosted storage box to the barcode scanning and recognition device 101 for scanning and identification, and information of the target storage box to be exacted or stored is inputted into the system.

In still a further preferred implementation in this embodiment, the extraction operation room is further provided with an observation window 102 and a detachable operation door 103. The observation window facilitates the observation of the extraction or storage process, and the detachable operation door facilitates maintenance of the extraction operation room.

The sequence of the above embodiments is for convenience of description only, and does not indicate the superiority or inferiority of the embodiments.

Finally, it should be noted that the above embodiments are merely intended to illustrate the technical solution of the present disclosure, but not to limit the same; although the present invention has been described in detail with reference to the foregoing embodiments, it should be understood by those of ordinary skill in the art that the technical solutions described in the foregoing embodiments may be modified or equivalents may be substituted for some of the technical features thereof; and the modification or substitution does not make the essence of the corresponding technical solution deviate from the spirit and the scope of the technical solution of each embodiment of the present disclosure.

What is claimed is:

1. An extraction operation room, comprising a multi-stage Z-direction extraction arm and an X-direction pushing system, wherein the multi-stage Z-direction extraction arm is a movable arm capable of achieving movements on a multi-distance road section in a Z-axis direction, an extraction member is disposed on the multi-stage Z-direction extraction arm, and the multi-stage Z-direction extraction arm is capable of driving the extraction member to move in the Z-axis direction;

the X-direction pushing system is arranged at a position corresponding to the extraction member, and the X-direction pushing system is capable of pushing a tank cover of a sample storage tank or a storage box extracted by the extraction member to a target position;

the multi-stage Z-direction extraction arm comprises a first Z-direction extraction arm, a second Z-direction extraction arm, and a receiving horizontal driving arm;

the receiving horizontal driving arm is arranged on the first Z-direction extraction arm, the first Z-direction extraction arm is capable of driving the receiving horizontal driving arm to move in the Z-axis direction, and the second Z-direction extraction arm is arranged on the receiving horizontal driving arm; the receiving horizontal driving arm is capable of driving the second Z-direction extraction arm to move horizontally in an X-axis direction; and the extraction member is arranged on the second Z-direction extraction arm, and the second Z-direction extraction arm is capable of driving the extraction member to move up and down in the Z-axis direction;

the X-direction pushing system further comprises an X-direction pushing member and a tank cover storage area; the X-direction pushing member is arranged opposite to the tank cover storage area; and the X-direction pushing member is capable of pushing the tank cover or the storage box extracted by the extraction member to the tank cover storage area or the target position;

the X-direction pushing member and the tank cover storage area are respectively arranged on both sides of the multi-stage Z-direction extraction arm in the X-axis direction;

the X-direction pushing member comprises a pushing base frame, a pushing drive motor, an X-axis moving push plate, and a pushing guide rod; wherein the pushing base frame is fixed below one side of the multi-stage Z-direction extraction arm, the pushing drive motor and the pushing guide rod are separately fixed on the pushing base frame, and the X-axis moving push plate moves along the pushing guide rod under a drive of the pushing drive motor; and the X-axis moving push plate is capable of moving and extending from one side of the multi-stage Z-direction extraction arm to the other side thereof, and is close to the tank cover storage area;

a reception and storage port is formed on one side of the tank cover storage area near the X-axis moving push plate;

further comprising a Y-direction receiving system; wherein the Y-direction receiving system is capable of receiving the storage box, and transporting the storage box to a position corresponding to the X-direction pushing system;

the Y-direction receiving system further comprises Y-direction tracks, a Y-direction movable tray, and a storage box receiving channel;

the Y-direction tracks extend in a Y-axis direction and is arranged below the pushing base frame; the storage box receiving channel is arranged on the Y-direction tracks in a sliding manner, and the storage box receiving channel has a certain length in the X-axis direction; and the Y-direction movable tray is arranged in the storage box receiving channel in the X-axis direction in a sliding manner;

the Y-direction receiving system further comprises a storage box pushing member, and the storage box pushing member is arranged in a position corresponding to the storage box receiving channel, and is capable of pushing the Y-direction movable tray in the storage box receiving channel;

the storage box pushing member comprises a storage box pushing drive motor and a storage box pushing plate, the storage box pushing drive motor is arranged on a lower end face of the pushing base frame, the storage box pushing plate is arranged on the lower end face of the pushing base frame in a sliding manner, and the storage box pushing drive motor drives the storage box pushing plate to perform telescopic movements in the X-axis direction;

the storage box pushing plate comprises a first storage box pushing sub-plate, a second storage box pushing sub-plate, and a storage box pushing head, an upper end face of the first storage box pushing sub-plate is arranged on the lower end face of the pushing base frame in a sliding manner, one end of the first storage box pushing sub-plate is fixed at a right angle with one end of the second storage box pushing sub-plate, the other end of the second storage box pushing sub-plate is fixed at a right angle with the storage box pushing head, and the storage box pushing plate is shaped like an inverted "Z";

further comprising a storage box returning member; wherein the storage box returning member is arranged in a position opposite to the storage box pushing plate; and the storage box returning member comprises a returning push plate, and the returning push plate is capable of performing telescopic movements in the X-axis direction;

the storage box returning member further comprises a returning member base plate and a returning member drive motor; and the returning member base plate is arranged below a tank cover storage shell and in a position opposite to the storage box returning member, the returning push plate is slidably arranged on the returning member base plate under a drive of the returning member drive motor, and a returning pushing head is arranged on one side of the returning push plate close to the storage box pushing head.

2. The extraction operation room according to claim 1, wherein the first Z-direction extraction arm comprises a Z-direction driving sub-electric cylinder (A), a Z-direction driving sub-electric cylinder (B), a Z-direction track (A), and a Z-direction track (B); and the receiving horizontal driving arm comprises a driving track (C) and a driving electric cylinder (C);

the Z-direction track (A) and the Z-direction track (B) are vertically and symmetrically fixed in the Z-axis direction inside the extraction operation room, respectively, two ends of the driving track (C) are slidably arranged on the Z-direction track (A) and the Z-direction track (B), respectively, and the Z-direction driving sub-electric cylinder (A) and the Z-direction driving sub-electric cylinder (B) drive the two ends of the driving track (C) to move up and down, respectively; and the second Z-direction extraction arm is arranged on the driving track (C) in a sliding manner, and is driven by the driving electric cylinder (C); and the second Z-direction extraction arm comprises a Z-direction driving electric cylinder (D), and a lifting member is arranged on the Z-direction driving electric cylinder (D), which drives the lifting member to move up and down.

3. The extraction operation room according to claim 2, wherein the Y-direction receiving system further comprises a Y-direction driving motor, a Y-direction rotating shaft screw, and a storage box receiving channel engaging nut; the Y-direction driving motor drives one end of the Y-direction rotating shaft screw to rotate, and the other end of the Y-direction rotating shaft screw is rotationally arranged at one end of the Y-direction tracks away from the pushing base frame;

the storage box receiving channel engaging nut is fixed at one end of the storage box receiving channel, and the Y-direction rotating shaft screw is engaged with the storage box receiving channel engaging nut; and the Y-direction driving motor is arranged below a connection between the first storage box pushing sub-plate and the second storage box pushing sub-plate, and the storage box receiving channel is capable of moving to a position corresponding to the storage box pushing head.

4. The extraction operation room according to claim 3, wherein the Y-direction receiving system further comprises a cryogenic protection member, the cryogenic protection member is arranged beneath the storage box receiving channel or fixed to a lower end face of the storage box receiving channel; and an accommodating cavity is formed inside the cryogenic protection member, a plurality of nitrogen ports communicating with the accommodating cavity are formed on an upper end face of the cryogenic protection member, and the accommodating cavity is also communicated with a nitrogen supply pipeline.

5. The extraction operation room according to claim 4, wherein the cryogenic protection member is box-shaped, cylindrical, or hemispherical.

6. The extraction operation room according to claim 4, wherein the tank cover storage area comprises the tank cover storage shell and a tank cover storage driving member, the reception and storage port is formed on one side of the tank cover storage shell close to the X-direction pushing member, and a tank cover extraction port is formed on an end face of the tank cover storage shell close to the extraction member; and the tank cover storage driving member is capable of driving the tank cover storage shell to move in the X-axis direction.

7. The extraction operation room according to claim 5, wherein a tank cover storage driving member comprises a storage drive base, a storage drive track, and a storage drive linking plate frame; and the storage drive base is fixed inside the extraction operation room and is located below the other side of the multi-stage Z-direction extraction arm; the storage drive track is arranged on the storage drive base; and one end of the storage drive linking plate frame is arranged on the storage drive track in a sliding manner, and the other end thereof is fixed on the tank cover storage shell.

8. The extraction operation room according to claim 7, wherein the storage drive base is arranged above the tank cover storage shell, and a first storage sub-drive track and a second storage sub-drive track are symmetrically arranged on both sides of an upper end face of the storage drive base;

two rows of driving channels are arranged on two sides of the first storage sub-drive track and the second storage sub-drive track at the upper end face of the storage drive base in the X-axis direction; and the storage drive linking plate frame comprises a storage drive sliding plate, a first storage drive clamping plate, and a second storage drive clamping plate; the storage drive sliding plate is arranged on the first storage sub-drive track and the second storage sub-drive track in a sliding manner;

an upper end of the first storage drive clamping plate is vertically fixed on one side of the storage drive sliding plate, and a lower end of the first storage drive clamping plate passes through the driving channels on one side and is fixed on the tank cover storage shell; and an upper end of the second storage drive clamping plate is vertically fixed to the other side of the storage drive sliding plate, and a lower end of the second storage drive clamping plate passes through the driving channels on the other side and is fixed on the tank cover storage shell.

9. The extraction operation room according to claim 1, wherein an anode electromagnetic member is arranged on the extraction member; and an upper end face of the tank cover is provided with a cathode magnetic member, and an upper end face of a lifting basket is further provided with a cathode magnetic member.

10. The extraction operation room according to claim 1, wherein the multi-stage Z-direction extraction arm further comprises an X-advanced arm, the X-advanced arm is arranged on the second Z-direction extraction arm, and the second Z-direction extraction arm is capable of driving the X-advanced arm to move up and down in the Z-axis direction; and the extraction member is arranged on the X-advanced arm, and the X-advanced arm is capable of driving the extraction member to move in the X-axis direction; and an extraction handle extending to both sides is arranged at a lower end of the extraction member, a receiving slot is formed on an upper end face of the tank cover, the receiving slot is capable of receiving the extraction handle in the X-axis direction, and the extraction handle is capable of restricting an extraction of the receiving slot in the Z-axis direction.

11. An intelligent sample access system, comprising a transfer docking member, and the extraction operation room and the sample storage tank according to claim 1; wherein the extraction operation room is sealed and arranged at an upper end of the sample storage tank; and a sealing docking port is formed on the extraction operation room;

the transfer docking member is arranged on an outer side of the sample storage tank, the transfer docking member is capable of receiving a transfer box, and driving the transfer box to have an opening of the transfer box docked with the sealing docking port;

the transfer docking member comprises moving tracks, a mobile trolley, and a docking driving member; the moving tracks are arranged on the outer side of the sample storage tank, the mobile trolley is arranged on the moving tracks, and the mobile trolley is capable of driving the transfer box to move along the moving tracks; and the transfer docking member is capable of driving the transfer box, such that the opening of the transfer box is docked with the sealing docking port;

the moving tracks are C-shaped, U-shaped or concave;

the docking driving member comprises a docking drive motor, vertical docking tracks, and docking lifting frames; and the docking drive motor drives the docking lifting frames to move up and down along the vertical docking tracks;

the moving tracks are arranged at upper ends of the vertical docking tracks, forming a T-shape or an inverted L-shape; and one end of each of the moving tracks passes through the docking lifting frames; and upper ends of the docking lifting frames are two non-connected free ends, and each of the free ends is provided with a lifting receiving plate; a lifting support plate is arranged between the two lifting receiving plates; and the transfer box can be placed or arranged on the lifting support plate.

12. The intelligent sample access system according to claim 11, wherein a transfer box limiting plate is arranged on the lifting support plate, and the transfer box limiting plate is capable of limiting the transfer box.

13. The intelligent sample access system according to claim 12, wherein the mobile trolley comprises a trolley base, a trolley battery, and a contact pad connection plate;

trolley sliding grooves are formed on a lower end face of the trolley base, the trolley sliding grooves are slidably arranged on the moving tracks; and the trolley battery is arranged at a lower end of the trolley base, and the trolley battery is electrically connected to the contact pad connection plate; and a power contact plate is arranged on the moving tracks and in a position below the trolley base and corresponding to the contact pad connection plate.

14. The intelligent sample access system according to claim 13, wherein the mobile trolley further comprises a distance sensor, a microcontroller, a trolley motor, and trolley wheels, the distance sensor is arranged on the lower end face of the trolley base; and the microcontroller is electrically connected to both the distance sensor and the trolley motor, and the trolley motor is configured to drive the trolley wheels to move on the moving tracks.

15. The intelligent sample access system according to claim 14, wherein the moving tracks comprises a first sub-track, a second sub-track, and a mobile trolley support plate; the first sub-track and the second sub-track are symmetrically arranged on both sides of an upper end face of the mobile trolley support plate; and two sets of the trolley sliding grooves are formed on two sides of the lower end face of the trolley base, and the two sets of the trolley sliding groove are slidably arranged on the first sub-track and the second sub-track, respectively;

the power contact plate is arranged on the mobile trolley support plate; and wheel pads are arranged on the mobile trolley support plate, and the trolley wheels move on the wheel pads.

16. The intelligent sample access system according to claim 15, wherein a trolley positioning column is fixedly arranged on an upper end face of the trolley base of the mobile trolley; and a positioning hole corresponding to the trolley positioning column is formed on the lifting support plate.

17. The intelligent sample access system according to claim 11, wherein the extraction operation room further comprises a cover opening mechanism, the cover opening mechanism is arranged in a position corresponding to the sealing docking port, and the cover opening mechanism is capable of opening a transfer box cover on the opening of the transfer box docked with the sealing docking port.

18. The intelligent sample access system according to claim 17, wherein the cover opening mechanism comprises a cover-opening fixed base, a cover-opening drive member, a cover-opening large arm rod, a cover-opening small arm rod and a cover-opening disk; and the cover-opening fixed base is fixed inside the extraction operation room, and the cover-opening drive member is arranged on the cover-opening fixed base; one end of the cover-opening large arm rod is rotationally arranged on the cover-opening fixed base, one end of the cover-opening small arm rod is rotationally arranged on the other end of the cover-opening large arm rod, and the cover-opening disk is fixedly arranged on the other end of the cover-opening small arm rod; and the cover-opening drive member drives the cover-opening large arm rod to rotate.

19. The intelligent sample access system according to claim 18, wherein the cover-opening disk comprises a cover-opening body disk, a cover-opening positioning rod, and cover-opening electromagnetic members;

the cover-opening body disk is fixed at the other end of the cover-opening small arm rod, and the cover-opening positioning rod and a cover-opening electromagnetic positive member are arranged on the cover-opening body disk; and a transfer box positioning hole is formed on the transfer box cover, and the cover-opening positioning rod is capable of being inserted into the transfer box positioning hole; and an electromagnetic negative member of the transfer box cover is arranged on the transfer box cover, and the cover-opening electromagnetic positive member is capable of being adsorbed with the electromagnetic negative member of the transfer box cover.

20. The intelligent sample access system according to claim 19, wherein the cover-opening drive member comprises a cover-opening drive motor, a cover-opening drive guide rail, and a cover-opening drive sliding base; and the cover-opening drive motor drives the cover-opening drive sliding base to move up and down along the cover-opening drive guide rail, the cover-opening drive sliding base extends outwardly and is provided with a cover-opening rotating shaft, one end of the cover-opening rotating shaft is fixed on the cover-opening drive sliding base, and the other end of the cover-opening rotating shaft is rotationally or fixedly arranged on the cover-opening small arm rod.

21. The intelligent sample access system according to claim 12, wherein the sample storage tank comprises a sample tank body, a built-in liquid nitrogen tank body, a turntable, a sample storage rotating shaft member, a sample storage motor, a lifting basket, and the tank cover;

an upper end face of the sample tank body is covered with the tank cover;

the built-in liquid nitrogen tank body is arranged inside the sample tank body, and a receiving rotary groove is formed on an upper end face of the internal liquid nitrogen tank body;

the sample storage motor drives the sample storage rotating shaft member to rotate, a lower end of the sample storage rotating shaft member is rotationally arranged on the receiving rotary groove; a turntable is fixedly arranged on a periphery of the sample storage rotating shaft member; and the lifting basket is arranged on the turntable; and the sample storage rotating shaft member comprises a central rotating shaft and a receiving rotary shaft; the sample storage motor drives the central rotating shaft, the central rotating shaft contains a nitrogen filling chamber, and a lower end of the central rotating shaft is coaxially connected to the receiving rotary shaft, and a lower end of the receiving rotary shaft is rotationally arranged in the receiving rotary groove.

22. The intelligent sample access system according to claim 21, wherein an insulating layer is arranged on a tank wall inside the sample tank body.

23. The intelligent sample access system according to claim 22, wherein the extraction operation room is further provided with a defrosting mechanism and a barcode scanning and recognition device, the defrosting mechanism is arranged near the sealing docking port, and the barcode scanning and recognition device is arranged near the defrosting mechanism.

24. The intelligent sample access system according to claim 23, wherein the extraction operation room is further provided with an observation window and a detachable operation door.

* * * * *